(12) United States Patent
Kim et al.

(10) Patent No.: US 10,805,122 B2
(45) Date of Patent: *Oct. 13, 2020

(54) WIRELESS COMMUNICATION DEVICES AND CHANNEL ESTIMATION METHODS THEREOF

(71) Applicant: Samsung Electronics Co., Ltd., Suwon-si, Gyeonggi-do (KR)

(72) Inventors: Jin-ho Kim, Seoul (KR); Hyun-seung Joo, Seoul (KR); In-hyoung Kim, Yongin-si (KR); Young-seok Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,470

(22) Filed: Jan. 3, 2020

(65) Prior Publication Data

US 2020/0145258 A1    May 7, 2020

Related U.S. Application Data

(63) Continuation of application No. 15/797,473, filed on Oct. 30, 2017, now Pat. No. 10,530,609.

(30) Foreign Application Priority Data

Dec. 27, 2016 (KR) .......................... 10-2016-0180139

(51) Int. Cl.
*H04L 25/02* (2006.01)
*H04B 7/0456* (2017.01)

(52) U.S. Cl.
CPC ....... *H04L 25/0228* (2013.01); *H04B 7/0456* (2013.01); *H04L 25/0222* (2013.01)

(58) Field of Classification Search
CPC ........... H04L 25/0228; H04L 25/0222; H04B 7/0456

See application file for complete search history.

(56) References Cited

U.S. PATENT DOCUMENTS 8,238,483 B2    8/2012  Erell et al.
8,559,398 B2   10/2013  Lindoff et al.
(Continued)

OTHER PUBLICATIONS

Non-Final Office Action dated Feb. 25, 2019 in U.S. Appl. No. 15/797,473.

(Continued)

*Primary Examiner* — Dinh Nguyen
(74) *Attorney, Agent, or Firm* — Harness, Dickey & Pierce, P.L.C.

(57) ABSTRACT

Provided are a wireless communication apparatus and a channel estimation methods of the wireless communication apparatus. The channel estimation methods includes receiving a first sub-frame and a second sub-frame, the first sub-frame including a plurality of first reference signals pre-coded based on a first pre-coding matrix and the second sub-frame including a plurality of second reference signals pre-coded based on a second pre-coding matrix; determining whether the first pre-coding matrix and the second pre-coding matrix are the same, based on a channel variation in the time domain; and performing, in response to determining that the first pre-coding matrix and the second pre-coding matrix are the same, channel estimation with respect to a resource element included in the second sub-frame based on at least of the plurality of first reference signals and at least one of the plurality of second reference signals.

20 Claims, 18 Drawing Sheets

(56) References Cited

U.S. PATENT DOCUMENTS

| | | |
|---|---|---|
| 8,948,297 B2 | 2/2015 | Zhang et al. |
| 9,246,568 B2 | 1/2016 | Gao et al. |
| 9,253,771 B2 | 2/2016 | Miao et al. |
| 9,253,784 B2 | 2/2016 | Liu et al. |
| 2007/0201587 A1 | 8/2007 | Sato |
| 2008/0212462 A1 | 9/2008 | Ahn et al. |
| 2011/0075743 A1* | 3/2011 | Koike ................. H04L 25/0232 375/259 |
| 2011/0080969 A1 | 4/2011 | Jongren et al. |
| 2011/0255483 A1 | 10/2011 | Xu et al. |
| 2012/0121031 A1* | 5/2012 | Tang ................... H04B 7/0691 375/267 |
| 2013/0064207 A1* | 3/2013 | Wang .................. H04B 7/0456 370/329 |
| 2013/0294369 A1 | 11/2013 | Dinan |
| 2014/0036804 A1* | 2/2014 | Chen .................... H04L 5/0053 370/329 |
| 2014/0301287 A1 | 10/2014 | Frenne et al. |
| 2015/0098369 A1 | 4/2015 | Song et al. |
| 2015/0365145 A1 | 12/2015 | Schober et al. |

OTHER PUBLICATIONS

Notice of Allowance dated Aug. 30, 2019 in U.S. Appl. No. 15/797,473.

\* cited by examiner

WIRELESS COMMUNICATION DEVICES AND CHANNEL ESTIMATION METHODS THEREOF

CROSS-REFERENCE TO RELATED APPLICATIONS

This application is a Continuation of U.S. application Ser. No. 15/797,473, filed on Oct. 30, 2017, which claims the benefit of Korean Patent Application No. 10-2016-0180139, filed on Dec. 27, 2016, in the Korean Intellectual Property Office, the disclosure of each of which is incorporated herein in their entirety by reference.

BACKGROUND

Some example embodiments relate to wireless communication, and more particularly, to wireless communication apparatuses that perform channel estimation and channel estimation methods of the wireless communication apparatuses.

In a wireless communication environment, the state of a wireless channel varies irregularly in time and frequency domains. A receiver may perform channel estimation to determine a degree of distortion of a signal received through a wireless channel and may decode a transmission signal from the received signal based on an estimated channel value.

According to transmission mode 7 of the long term evolution (LTE) standard and transmission modes released thereafter, a receiver may perform channel estimation with respect to a target resource element based on reference signals including pre-coded reference signals from among received symbols.

SUMMARY

Some example embodiments provide a wireless communication apparatus capable of improving channel estimation efficiency by performing channel estimation based on reference signals of adjacent sub-frames based on pre-coding information regarding respective sub-frames and operating methods of the wireless communication apparatus According to some example embodiments, there is provided channel estimation methods of a wireless communication apparatus, the methods include receiving a first sub-frame and a second sub-frame, the first sub-frame including a plurality of first reference signals pre-coded based on a first pre-coding matrix and the second sub-frame including a plurality of second reference signals pre-coded based on a second pre-coding matrix. The methods further include determining whether the first pre-coding matrix and the second pre-coding matrix are the same, based on a channel variation in the time domain. Furthermore, the methods include performing, in response to determining that the first pre-coding matrix and the second pre-coding matrix are the same, channel estimation with respect to a resource element included in the second sub-frame based on at least of the plurality of first reference signals and at least one of the plurality of second reference signals.

According to some example embodiments, there are provided channel estimation methods of a wireless communication apparatus, the methods include sequentially receiving a plurality of sub-frames, each of the sub-frames including pre-coded reference signals. The methods further include determining whether pre-coding matrices respectively applied to the plurality of sub-frames are the same based on a channel variation between the plurality of sub-frames. Furthermore, the methods include performing a data recovery operation regarding at least one of a first sub-frame and a second sub-frame having the same pre-coding matrices from among the plurality of sub-frames, based on first reference signals and second reference signals included in the first sub-frame and the second sub-frame, respectively.

According to some example embodiments, there are provided methods performed by a wireless communication apparatus, the methods include receiving a first sub-frame and a second sub-frame, the first sub-frame including a plurality of first reference signals pre-coded based on a first pre-coding matrix and the second sub-frame including a plurality of second reference signals pre-coded based on a second pre-coding matrix. The methods further include calculating a first channel value regarding at least one of the plurality of first reference signals. The methods further include calculating a second channel value regarding at least one of the plurality of second reference signals. The methods further include calculating an inter sub-frame channel variation based on the first channel value and the second channel value. The methods further include determining whether the first pre-coding matrix and the second pre-coding matrix are the same, based on the inter sub-frame channel variation. Furthermore, the methods include performing, in response to determining that the first pre-coding matrix and the second pre-coding matrix are the same, channel estimation with respect to a resource element included in the second sub-frame based on at least one of the plurality of first reference signals and at least one of the plurality of second reference signals.

BRIEF DESCRIPTION OF THE DRAWINGS

Some example embodiments will be more clearly understood from the following detailed description taken in conjunction with the accompanying drawings in which.

DETAILED DESCRIPTION

Figure 1:
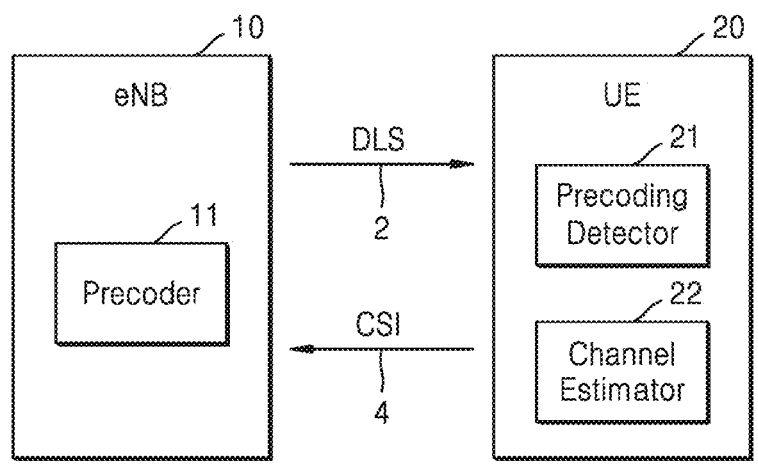
FIG. 1 is a block diagram showing a wireless transmission system according to some example embodiments.

FIG. 1 is a block diagram showing a wireless transmission system according to some example embodiments. Referring to FIG. 1, a wireless communication system 1 may include a base station (eNB) 10 and a terminal (User Equipment (UE)) 20. The terminal 20 may be located within the cell coverage of the base station 10. The base station 10 and the terminal 20 may communicate with each other via a downlink channel 2 and an uplink channel 4. In the case of communicating via the downlink channel 2, the base station 10 and the terminal 20 may correspond to a radio transmitter and a radio receiver, respectively. In the case of communicating via the uplink channel 4, the base station 10 and the terminal 20 may correspond to a radio receiver and a radio transmitter, respectively.

The base station 10 may be referred to as a fixed station communicating with the terminal 20 and/or other base stations and may communicate with the terminal 20 and/or other base stations to transmit and receive data and/or control information to and from the terminal 20 and/or other base stations. For example, the base station 10 may be referred to as a Node B, an evolved Node B (eNB), a base transceiver system (BTS), or an access point (AP). The terminal 20 may also refer to various wireless communication apparatuses capable of communicating with the base station 10 (e.g., transmitting and receiving data and/or control information to and from the base station 10). For example, the terminal 20 may be referred to as user equipment (UE), a mobile station (MS), a mobile terminal (MT), a user terminal (UT), a subscriber station (SS), etc.

A wireless communication network between the base station 10 and the terminal 20 may support communication between multiple users by sharing available network resources. For example, in a wireless communication network, data may be transferred in various protocols, e.g., code division multiple access (CDMA), frequency division multiple access (FDMA), time division multiple access (TDMA), orthogonal frequency division multiple access (OFDMA), single carrier frequency division multiple access (SC-FDMA), etc.

The base station 10 may include a pre-coder 11, whereas the terminal 20 may include a pre-coding detector 21 and a channel estimator 22. Any or all of the components included in the base station 10 (e.g., the pre-coder 11) and the terminal 20 (e.g., the pre-coding detector 21 and the channel estimator 22) may be a hardware block including an analog circuit and/or a digital circuit or may be a software block including a plurality of instructions executed by a processor or the like.

The term 'processor', as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA). Operations described herein as being performed by any or all of the pre-coder 11, precoding detector 21 and channel estimator 22 may be performed by at least one processor executing program code that includes instructions stored in a memory corresponding to the operations.

The base station 10 may transmit a downlink signal (DLS) including data to the terminal 20 through at least one antenna port. According to some example embodiments, the base station 10 may transmit multi-layers through a plurality of antenna ports. The pre-coder 11 may pre-code data signals (also referred to as data symbols) and reference signals (also referred to as reference symbols) and transmit the pre-coded signals, that is, pre-coded data signals and pre-coded reference signals to the terminal 20 via the downlink channel 2. Here, a reference signal is a signal used for channel estimation regarding a data signal and may be referred to as a pilot. According to some example embodiments, a reference signal may include a demodulation reference signal (DM-RS) used for channel estimation regarding a particular terminal. According to some example embodiments, a reference signal may include a common reference signal (CRS) and/or a channel state information reference signal (CSI-RS). Furthermore, the reference signal may include various other types of signals. Hereinafter, unless stated otherwise, it will be assumed that a reference signal is a DM-RS signal.

The pre-coder 11 may pre-code signals, such as a data signal and a reference signal, based on a pre-coding matrix (also referred to as a code). According to some example embodiments, the pre-coder 11 may pre-code a data signal and a reference signal based on a pre-coding matrix that is not based on a codebook. When the pre-coder 11 performs pre-coding based on a pre-coding matrix not based on a codebook, the base station 10 may not transmit information regarding the applied pre-coding matrix to the terminal 20.

The terminal 20 may provide channel state information (CSI) to the base station 10 through the uplink channel 4, and the pre-coder 11 may change a pre-coding matrix based on the CSI. According to some example embodiments, the pre-coder 11 may change the pre-coding matrix by at least one sub-frame unit. However, some example embodiments are not limited thereto, and the pre-coder 11 may change a pre-coding matrix by a time interval according to a protocol of the wireless communication system 1. For example, the pre-coder 11 may change a pre-coding matrix by at least one time slot.

In the wireless communication system 1 according to some example embodiments, the terminal 20 may obtain pre-coding information regarding a plurality of received sub-frames and perform a data restoration operation based on the pre-coding information. The pre-coding information may include information regarding a pre-coding identity regarding the plurality of sub-frames.

For example, the terminal 20 may perform a channel estimation based on pre-coding information. The terminal 20 may use reference signals including in the sub-frames adjacent to each other to perform channel estimation. For example, when it is determined that a pre-coding matrix applied to a target sub-frame for channel estimation is the same as a pre-coding matrix applied to another sub-frame adjacent to the target sub-frame, the terminal 20 may use reference signals included in the other sub-frame to perform channel estimation regarding a resource element of the target sub-frame, e.g., a target resource element.

Sub-frames received by the terminal 20 include pre-coded reference signals. Channel values of reference signals used for channel estimation may vary according to wireless channel environments corresponding to respective layers, and each wireless channel environment may include a state where pre-coding is applied. The terminal 20 may perform channel estimation based on reference signals without specific information regarding pre-coding matrixes applied to respective sub-frames. In order to perform channel estimation with respect to a resource element based on the reference signals, it is desirable that a pre-coding matrix applied to the reference signals be the same as a pre-coding matrix applied to a resource element. When the pre-coding matrix applied to the reference signals is not the same as the pre-coding matrix applied to the resource element, it may be interpreted that the reference signals passed a wireless channel that is different from that corresponding to the target resource element. Therefore, to ensure the reliability of channel estimation, it is desirable to perform channel estimation with respect to a target resource element based on reference signals that passed through a same wireless channel as a wireless channel corresponding to the target resource element.

Meanwhile, since pre-coding may be changed by the sub-frame, it may be determined that resource elements included in one sub-frame correspond to a same wireless channel. Furthermore, when it is determined that there is a pre-coding identity between sub-frames adjacent to each other, it may be determined that resource elements included in the sub-frames adjacent to each other correspond to a same wireless channel. However, when it is determined that there is no pre-coding identity between sub-frames adjacent to each other, it may be determined that resource elements included in the sub-frames adjacent to each other correspond to different wireless channels. In this way, the terminal 20 may perform channel estimation based on a pre-coding identity between sub-frames adjacent to each other.

The pre-coding detector 21 may determine a pre-coding identity between a plurality of sub-frames, that is, an identity between pre-coding matrices applied to respective sub-frames. For example, the pre-coding detector 21 may determine a pre-coding granularity. The pre-coding granularity indicates the number of adjacent sub-frames in a group to which a same pre-coding matrix is applied.

According to some example embodiments, the pre-coding detector 21 may determine a pre-coding identity based on the degree of a channel variation between sub-frames adjacent to each other. The degree of channel variation between the sub-frames adjacent to each other may be referred to as an inter sub-frame channel variation. According to some example embodiments, the pre-coding detector 21 may compare an inter sub-frame channel variation with a reference channel variation in the time domain and determine a pre-coding identity based on a result of the comparison. For example, the reference channel variation may include a channel variation in the time domain due to the Doppler effect, intra sub-frame channel variations, and an average value of intra sub-channel variations regarding respective sub-frames, etc. The pre-coding detector 21 may determine that the pre-codings are the same when a difference between an inter sub-frame channel variation and a reference channel variation is less than a critical value. Methods of determining a pre-coding identity will be described below in detail with reference to FIGS. 9 through 16.

The channel estimator 22 may perform channel estimation based on reference signals included in sub-frames. The channel estimator 22 may perform channel estimation based on a pre-coding granularity. Channel estimator 22 may perform channel estimation based on reference signals included in sub-frames adjacent to each other when it is determined that pre-codings of the sub-frames adjacent to each other are the same or may perform channel estimation based on reference signals included in sub-frames to perform the channel estimation when it is determined that pre-codings of the sub-frames adjacent to each other are not the same. For example, when it is determined that pre-coding matrices (or codes) applied to an n–1$^{th}$ sub-frame and an n$^{th}$ sub-frame are the same, channel estimation may be performed with respect to resource elements of the n$^{th}$ sub-frame by using not only reference signals included in the n$^{th}$ sub-frame, but also reference signals included in the n–1$^{th}$ sub-frame. This may be referred to as an inter sub-frame interpolation channel estimation.

The channel estimator 22 may perform channel estimation based on reference signals included in a corresponding sub-frame to perform the channel estimation, when it is determined that pre-codings of sub-frames adjacent to each other are not the same. For example, when pre-coding matrices (or codes) applied to an n–1$^{th}$ sub-frame and an n$^{th}$ sub-frame are not the same as each other, channel estimation may be performed with respect to resource elements included in the n$^{th}$ sub-frame by using reference signals included in the n$^{th}$ sub-frame. This may be referred to as an intra sub-frame interpolation channel estimation.

As described above, in the wireless communication system 1 according to some example embodiments, the terminal 20 determines a pre-coding identity between sub-frames based on the degree of a channel variation between sub-frames and, when it is determined that pre-codings of the sub-frames are the same, an interpolation channel estimation, that is, an inter sub-frame interpolation channel estimation may be performed by using reference signals of sub-frames adjacent to each other. Therefore, the channel estimation efficiency of the terminal 20 may be improved.

Figure 2:
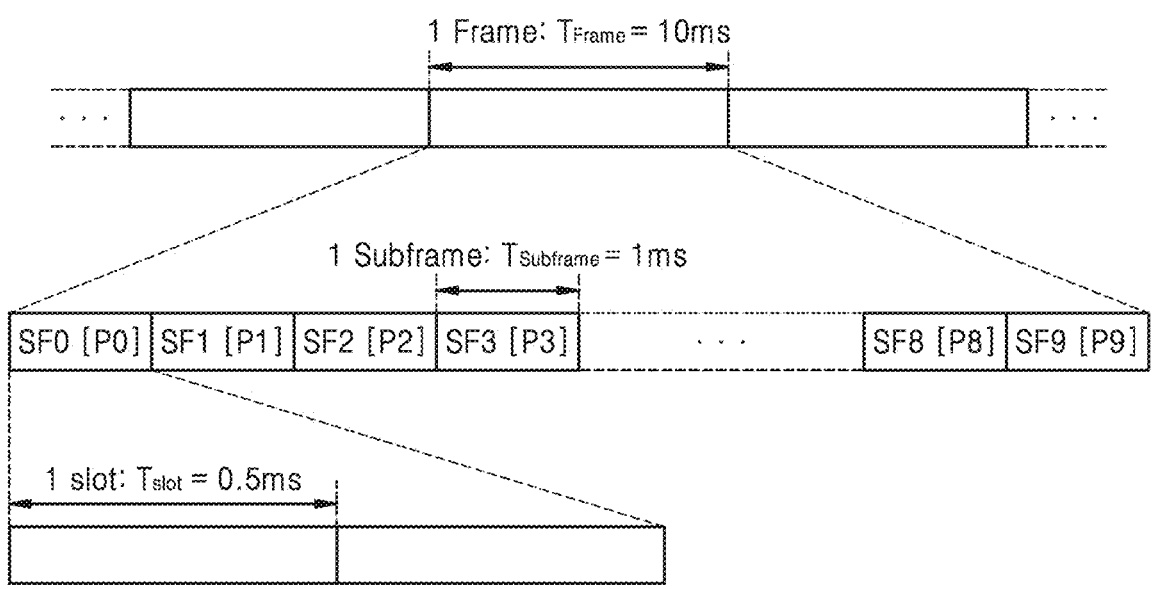
FIG. 2 is a diagram showing an example of a frame structure of a downlink signal.

FIG. 2 is a diagram showing an example of a frame structure of a downlink signal. Specifically, FIG. 2 shows a frame structure in a 3GPP LTE-based communication system.

Referring to FIG. 2, a downlink signal DLS transmitted through a downlink channel (e.g., downlink channel 2 of FIG. 1) may include a plurality of frames, and one frame (or a radio frame) may include ten sub-frames SF0 through SF9. A terminal (e.g., terminal 20 of FIG. 1) may sequentially receive the sub-frames SF0 through SF9, where the sub-frame SF0 may be received first, and the sub-frame SF9 may be received at the end. One sub-frame may include two slots. A slot may include a plurality of resource blocks on the frequency axis. The time period elapsed for transmitting one sub-frame is referred to as a transmission time interval (TTI). In a 3GPP LTE-based communication system, a sub-frame corresponds to 1 ms ($T_{Subframe}$=1 ms) and a slot corresponds to 0.5 ms ($T_{slot}$=0.5 ms). In some example embodiments, where one frame may include ten sub-frames, one frame corresponds to 10 ms ($T_{Frame}$=10 ms). However, structures of the radio frame and TTIs may vary according to communication systems.

As shown in FIG. 2, pre-coding matrices P0 through P9 may be applied to the sub-frames SF0 through SF9, respectively. For example, the sub-frame SF0 may include signals pre-coded based on the pre-coding matrix P0, and the sub-frame SF1 may include signals pre-coded based on the pre-coding matrix P1. The pre-coded signals may include data signals and reference signals. At this time, the pre-coding matrices P0 through P9 may be the same as or different from one another. As described above with reference to FIG. 1, when pre-coding matrixes applied to sub-frames adjacent to each other are the same as each other, the terminal may perform an inter sub-frame interpolation estimation. In other words, when a pre-coding matrix applied to a target sub-frame to which channel estimation is to be performed is the same as a pre-coding matrix applied to another sub-frame adjacent thereto, channel estimation may be performed by using reference signals included in the target sub-frame and reference signals included in the other sub-frame.

For example, when it is determined that the pre-coding matrix P1 applied to the sub-frame SF1 and the pre-coding matrix P2 applied to the sub-frame SF2 are the same as each other, channel estimation may be performed with respect to resource elements of the sub-frame SF2 based on reference signals included in the sub-frame SF1 and the sub-frame SF2. However, some example embodiments are not limited thereto. In another example, when it is determined that the pre-coding matrix P1 applied to the sub-frame SF1 and the pre-coding matrix P2 applied to the sub-frame SF2 are the same as each other, channel estimation may be performed with respect to resource elements of the sub-frame SF1 based on reference signals included in the sub-frame SF1 and the sub-frame SF2. In another example, when it is determined that the pre-coding matrix P1 applied to the sub-frame SF1, the pre-coding matrix P2 applied to the sub-frame SF2, and the pre-coding matrix P3 applied to the sub-frame SF3 are the same as one another, channel estimation may be performed with respect to resource elements of the sub-frame SF3 based on reference signals included in the sub-frame SF1, the sub-frame SF2, and the sub-frame SF3.

Figure 3:
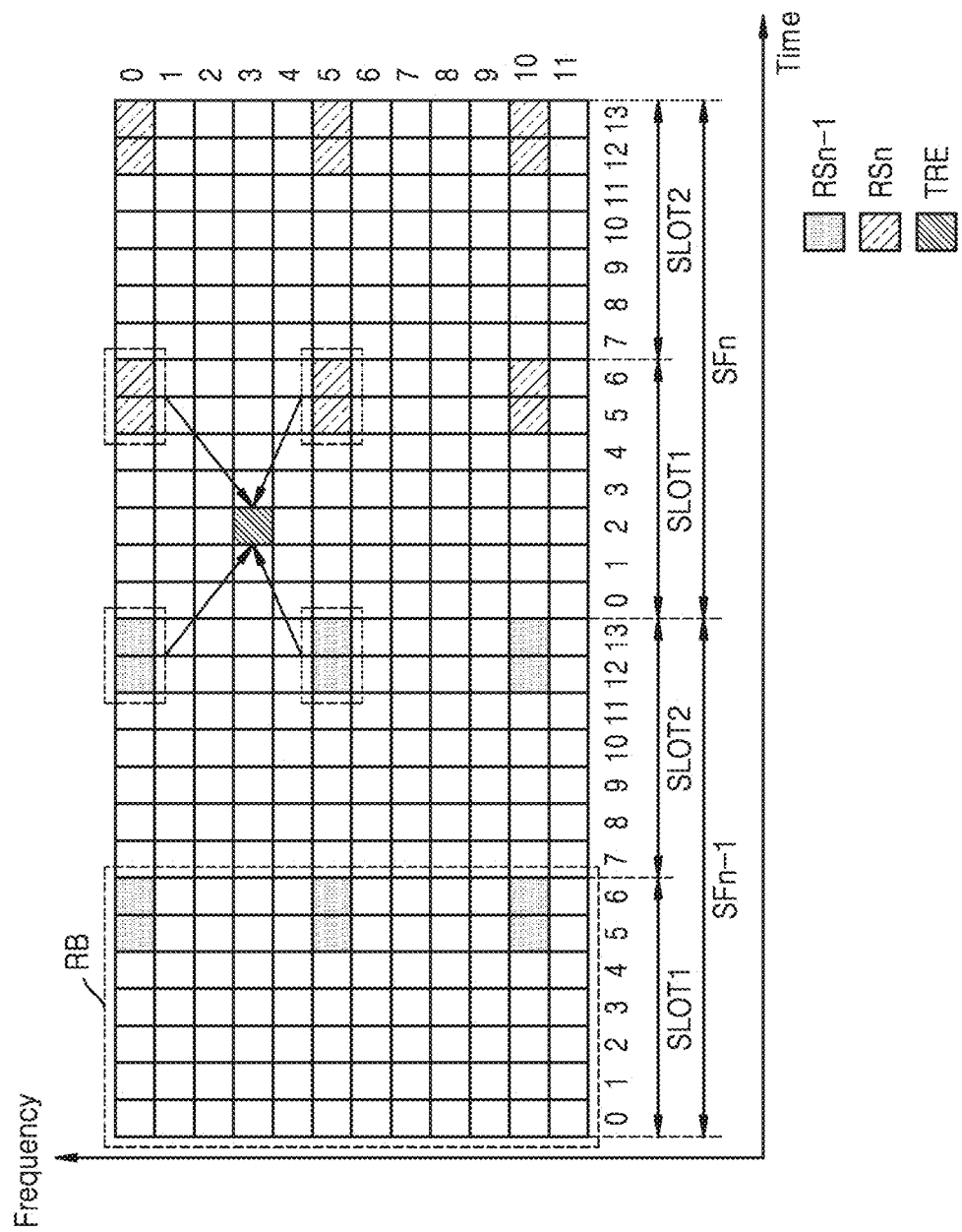
FIG. 3 is a diagram for describing channel estimation methods according to some example embodiments.
Figure 4:
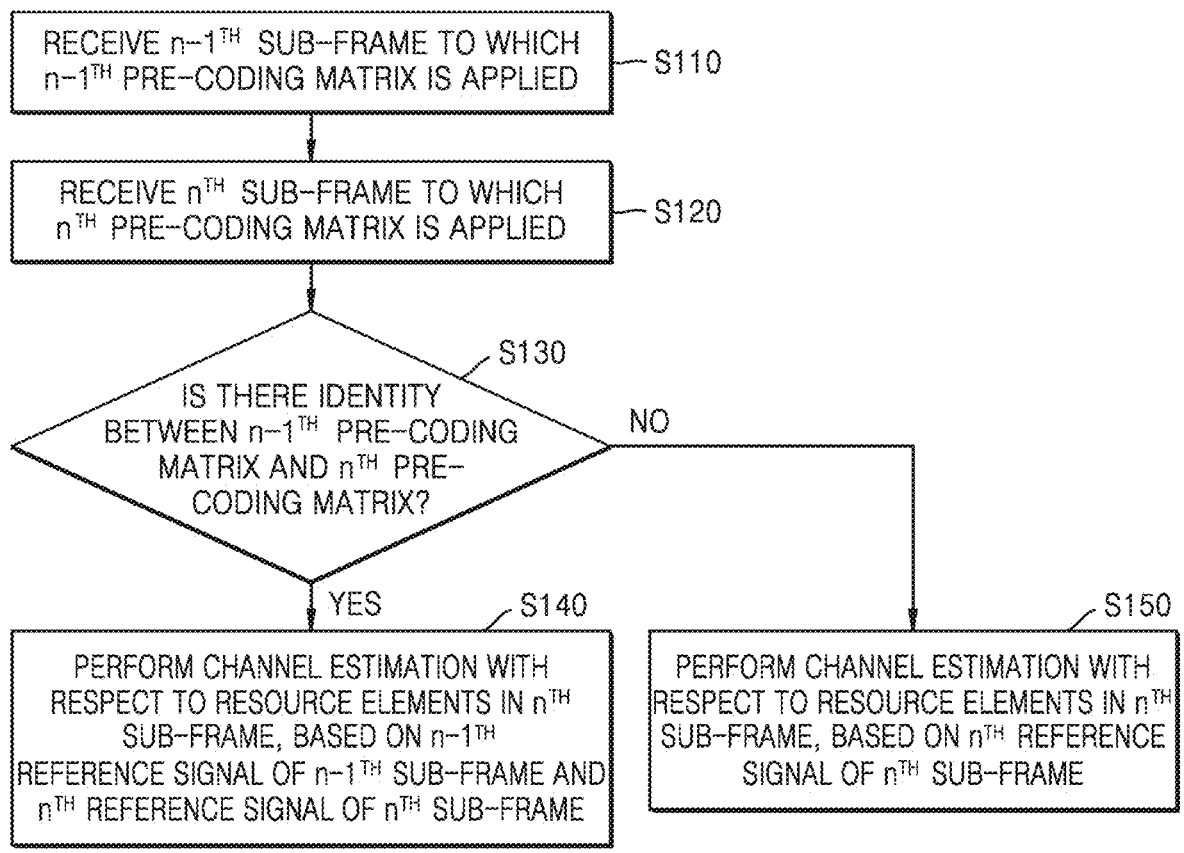
FIG. 4 is a flowchart of channel estimation methods according to some example embodiments.

FIG. 3 is a diagram for describing channel estimation methods according to some example embodiments, and FIG. 4 is a flowchart of channel estimation methods according to some example embodiments. The channel estimation methods of FIGS. 3 and 4 may be performed by a terminal (e.g., terminal 20 of FIG. 1) according to some example embodiments. Therefore, the descriptions given above with reference to FIG. 1 may be applied to some example embodiments below.

Referring to FIG. 3, the horizontal axis represents time and the vertical axis represents frequency. The numbers on the horizontal axis are symbol indices, and the numbers on the vertical axis are sub-carrier indices. The two slots (e.g., SLOT1 and SLOT2) constitute one sub-frame SFn−1 or SFn. One slot, e.g., the first slot SLOT1, may include seven symbols in the time domain and twelve sub-carriers in the frequency domain, and the seven symbols and twelve sub-carriers may constitute a resource block RB. The base station (e.g., base station 10 of FIG. 1) may transmit reference signals (for example RSn−1 and RSn) at pre-set time-frequency locations (resource elements) for every downlink sub-frame, for channel estimation. Data signals may be transmitted over different time-frequency locations. Some of the data signals may correspond to various physical channels.

Referring to FIG. 3, reference signals may be placed (or mapped) to resource elements corresponding to sub-carrier indices 0, 5, and 10 and symbol indices 5, 6, 12, and 13. Two reference signals successively arranged in the time domain may be referred to as a reference signal pair. In some example embodiments, a reference signal pair may be substantially treated as one reference signal for calculation of channel values of reference signals and channel estimation. FIG. 3 shows merely an example of arrangements of reference signals. The number of reference signals included in one sub-frame and the arrangement pattern of reference signals may vary according to an antenna port through which a sub-frame is transmitted, a transmission mode, etc.

Meanwhile, the signal y (k, l) received through the resource element may be expressed by Equation (1).

$$y(k, l) = \sum_{i=0}^{L-1} H_i(k, l)x_i(k, l)w_i(k, l) + n(k, l) \quad \text{[Equation 1]}$$

Here, k and l denote a subcarrier index and a symbol index of a resource element, respectively. L denotes the number of layers, and i denotes an antenna port index (or a layer index). Hi(k, l) denotes a channel value of an ith antenna port (or ith layer). In this case, Hi(k, l) is a value reflecting pre-coding. xi(k, l) denotes a reference signal allocated to a resource element, and wi(k, l) denotes a Walsh code applied to the resource element. Furthermore, n(k, l) denotes noise. xi(k, l) and wi(k, l) may be values that a receiver already knows.

After descrambling and despreading received signals, the channel value $\tilde{H}_i(k, l)$ of the resource element corresponding to reference signals (or a reference signal pair) may be expressed as shown in Equation 2.

$$\tilde{H}_i(k, l) = \frac{1}{2}\sum_{s=0}^{1} y(k, l+s)(x_i(k, l+s)w_i(k, l+s))^* \quad \text{[Equation 2]}$$

Since values corresponding to the reference signals in the right part of Equation 2 are values that the receiver already knows, channel values regarding the reference signals may be calculated based on Equation 2, and channel estimation, e.g., interpolation channel estimation, may be performed with respect to a target element TRE.

A pre-coding matrix applied to the n−1$^{th}$ sub-frame SFn−1 and a pre-coding matrix applied to the n$^{th}$ sub-frame SFn may be the same as or different from each other. In other words, in the base station, a pre-coding matrix used for performing pre-coding with respect to the n−1$^{th}$ reference signals RSn−1 included in the n−1$^{th}$ sub-frame SFn−1 and a pre-coding matrix used for performing pre-coding with respect to the n$^{th}$ reference signals RSn included in the n$^{th}$ sub-frame SFn may be the same as or different from each other. As described above, since the channel Hi(k, l) is a value reflecting pre-coding, the channel Hi(k, l)n−1 of the n−1$^{th}$ sub-frame SFn−1 may be substantially expressed as Pn−1(k, l)Hi(k, l), whereas the channel Hi(k, l)n of the n$^{th}$ sub-frame SFn may be substantially expressed as Pn(k, l)Hi(k, l). Here, the Pn−1(k, l) and the Pn(k, l) denote a pre-coding matrix applied to the n−1$^{th}$ sub-frame SFn−1 and a pre-coding matrix applied to the n$^{th}$ sub-frame SFn, respectively. When it is determined that the Pn−1(k, l) is the same as the Pn(k, l), an inter inter-frame interpolation channel estimation may be performed.

Referring to FIGS. 3 and 4, the terminal (e.g., terminal 20 of FIG. 1) may receive the n−1$^{th}$ sub-frame to which the n−1$^{th}$ pre-coding matrix is applied (operation S110) and may then receive the n$^{th}$ sub-frame to which the n$^{th}$ pre-coding matrix is applied (operation S120). The terminal 20 may sequentially receive the n−1$^{th}$ sub-frame and the n$^{th}$ sub-frame. The pre-coding detector (e.g., pre-coding detector 21 of FIG. 1) of the terminal may determine an identity between the n−1$^{th}$ pre-coding matrix and the n$^{th}$ pre-coding matrix (operation S130). For example, the pre-coding detector may determine an identity between the pre-coding matrices based on a channel variation between sub-frames.

When it is determined that the pre-coding matrices are the same as each other, the channel estimator (e.g., channel estimator 22 of FIG. 1) may perform channel estimation with respect to a target resource element TRE included in the n$^{th}$ sub-frame, based on n−1$^{th}$ reference signals RSn−1 of the n−1$^{th}$ sub-frame and n$^{th}$ reference signals RSn of the n$^{th}$ sub-frame (operation S140). Referring to FIG. 3, channel estimation may be performed based on reference signals adjacent to a target resource element TRE in the time domain and the frequency domain. However, the channel estimation methods are not limited thereto, and various modifications may be made therein. For example, channel estimation may be performed with respect to the target resource element TRE based on reference signals adjacent to the target resource element TRE in the time domain. Alternatively, channel estimation may be performed with respect to the target resource element TRE based on all reference signals included in the n−1$^{th}$ sub-frame SFn−1 and the n$^{th}$ sub-frame SFn.

When it is determined that the pre-coding matrices are not the same as each other, the channel estimator may perform channel estimation with respect to the target resource element TRE included in the n$^{th}$ sub-frame SFn based on the n$^{th}$ reference signals included in the n$^{th}$ sub-frame SFn (operation S150). The channel estimator may perform channel estimation with respect to the target resource element TRE based on at least some of the n$^{th}$ reference signals RSn included in the n$^{th}$ sub-frame SFn.

For channel estimation, averaging interpolation channel estimation and linear interpolation channel estimation may be used. For example, the channel estimator may perform interpolation channel estimation based on the channel value $\tilde{H}_i(k, l)$ of a resource element corresponding to a reference signal pair. Furthermore, various channel estimation techniques, e.g., minimum-mean-square-error (MMSE) estimation performed based on more detailed information regarding the characteristics of a channel in the time domain and the frequency domain may be applied.

Figure 5:
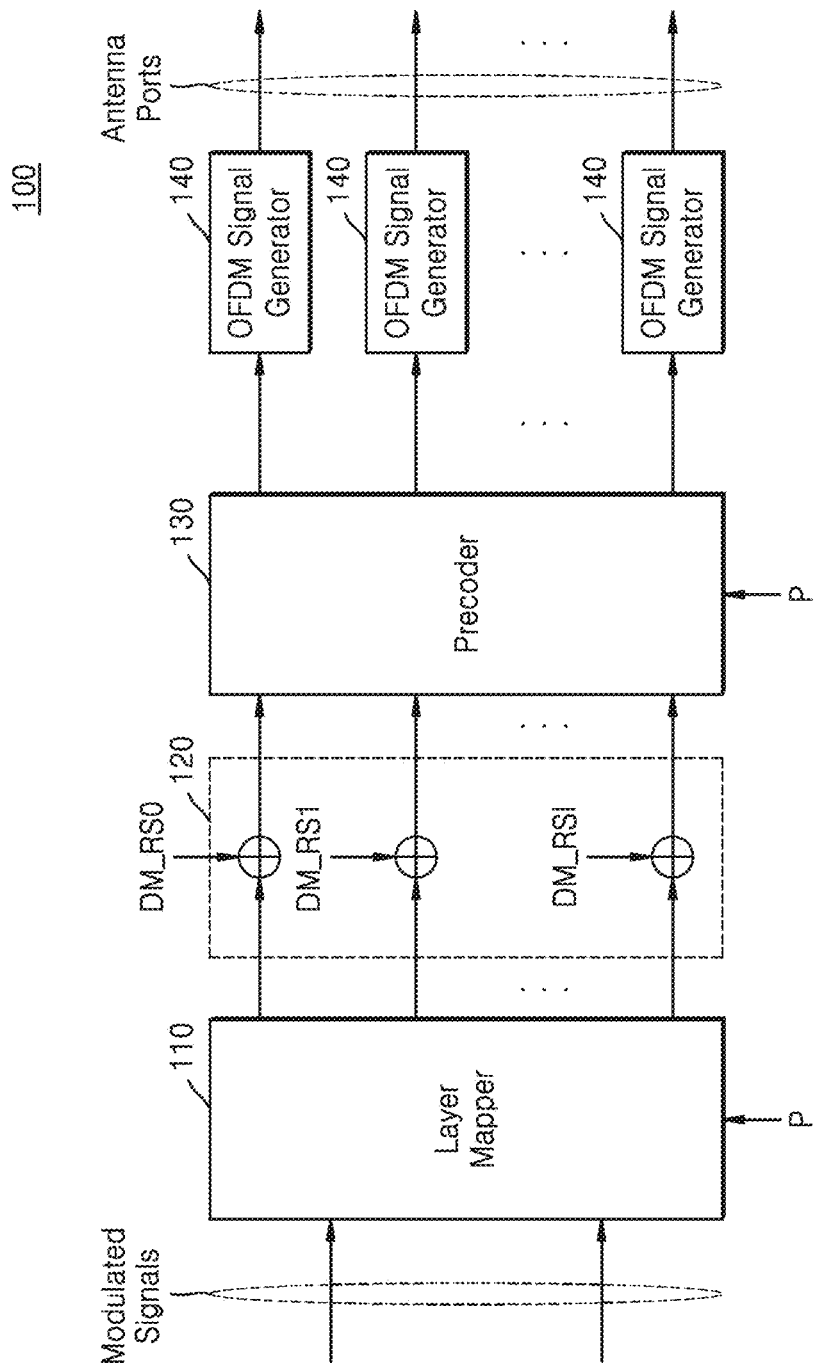
FIG. 5 is a block diagram showing a transmitter of a base station according to some example embodiments.

FIG. 5 is a block diagram showing a transmitter of a base station according to some example embodiments.

Referring to FIG. 5, a base station (e.g., base station 10 of FIG. 1) may include a transmitter 100. The transmitter 100 may include a layer mapper 110, a resource element mapper 120, a pre-coder 130, and at least one orthogonal frequency division multiplexing (OFDM) signal generator 140. Any of all of the components of the transmitter 100 (e.g., the layer mapper 110, the resource element mapper 120, the pre-coder 130, and the OFDM signal generator 140) may be a hardware block including an analog circuit and/or a digital circuit, and may be a software block including a plurality of instructions that are executed by a processor or the like. Operations described herein as being performed by any or all of the layer mapper 110, the resource element mapper 120, the pre-coder 130, and the OFDM signal generator 140 may be performed by at least one processor executing program code that includes instructions stored in a memory corresponding to the operations.

The layer mapper 110 may map modulation signals (or modulation symbols) corresponding to one or more transmission blocks to one or more layers. The modulated signals may be modulated data signals. The number of layers may vary from one to the total number of antenna ports of the base station.

The resource element mapper 120 may map reference signals DM_RS0, DM_RS1, . . . , and DM_RSI corresponding to respective layers, and modulated signals mapped to the respective layers, to resource elements in the time-frequency resource domain of a downlink.

The pre-coder 130 may pre-code signals mapped to resource elements by using a pre-coding matrix P. According to some example embodiments, the pre-coder 130 may pre-code a data signal and a reference signal based on a pre-coding matrix that is not based on a codebook. According to some example embodiments, the pre-coding matrix P provided to the pre-coder 130 may be changed by the sub-frame, and the pre-coding matrix P may be changed based on CSI received from the terminal (e.g., terminal 20 of FIG. 1). However, some example embodiments are not limited thereto, and the pre-coding matrix P may be changed by the time interval according to the protocol of the wireless communication system (e.g., wireless communication system 1 of FIG. 1).

The at least one OFDM signal generator 140 may generate downlink signals by multiplexing pre-coded signals based on an orthogonal frequency division multiplexing (OFDM) scheme. The downlink signals may be transmitted to a terminal via corresponding antenna ports, respectively. Meanwhile, the block configuration of the transmitter 100 of the base station shown in FIG. 5 is merely an example, and the transmitter 100 of the base station may have any of various block configurations according to various communication protocols other than the block configuration shown in FIG. 5.

Figure 6:
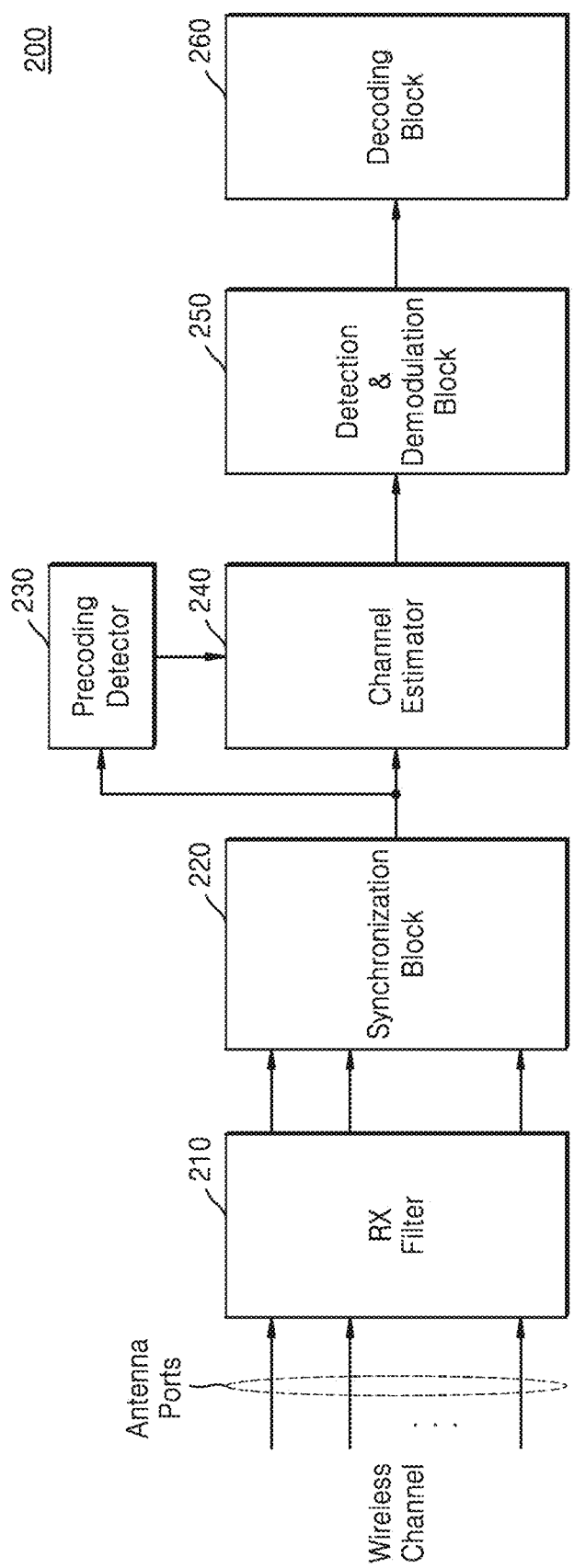
FIG. 6 is a block diagram showing a receiver of a terminal according to some example embodiments.

FIG. 6 is a block diagram showing a receiver of a terminal according to some example embodiments.

Referring to FIG. 6, a terminal (e.g., terminal 20 of FIG. 1) may include a receiver 200. The receiver 200 may include an RX filter 210, a synchronizer 220 (depicted as a synchronization block), a pre-coding detector 230, a channel estimator 240, a detector/demodulator 250 (depicted as a detection and demodulation block), and a decoder 260 (depicted as a decoding block). Any of all of the components of the receiver 200 (e.g., the RX filter 210, the synchronizer 220, the pre-coding detector 230, the channel estimator 240, the detector/demodulator 250, and the decoder 260) may be a hardware block including an analog circuit and/or a digital circuit, and may be a software block including a plurality of instructions that are executed by a processor or the like. Operations described herein as being performed by any or all of the RX filter 210, the synchronizer 220, the pre-coding detector 230, the channel estimator 240, the detector/demodulator 250, and the decoder 260 may be performed by at least one processor executing program code that includes instructions stored in a memory corresponding to the operations.

The RX filter 210 may pass signals having frequencies that a terminal may receive and process from among downlink signals received from antenna ports of a base station (e.g., base station 10 of FIG. 1) through a wireless channel. The RX filter 210 may also convert received signals into digital signals.

When the terminal 20 initially accesses a cell and then performs handover or cell reselection from a currently connected cell to another cell, the synchronizer 220 may perform a cell search by using synchronization signals included in filtered downlink signals (e.g., a primary synchronous signal (PSS) and a secondary synchronous signal (SSS)). The synchronizer 220 may obtain frequency and symbol synchronizations regarding a cell through the cell search. The synchronizer 220 may also obtain a downlink frame synchronization regarding a cell and determine a cell identifier (ID).

The pre-coding detector 230 may determine a pre-coding identity between a plurality of sub-frames, that is, an identity between pre-coding matrices applied to respective sub-frames. The pre-coding detector 230 may determine a pre-coding identity based on the degree of a channel variation between sub-frames adjacent to each other.

The channel estimator 240 may perform channel estimation regarding a sub-frame. The channel estimator 240 may generate channel values of resource elements mapped to reference signals and then perform channel estimation regarding a target resource element by using the channel values. The channel estimator 240 may perform channel estimation regarding the target resource element by using not only reference signals regarding the sub-frame to which the target resource element belongs, but also reference signals of an adjacent sub-frame having a pre-coding identity.

Operations of the pre-coding detector 230 and the channel estimator 240 are similar to those of the pre-coding detector 21 and the channel estimator 22 of FIG. 1, descriptions thereof already given above will be omitted.

The detector/demodulator 250 may detect a data signal using downlink channel estimation and demodulate the detected data signal. The operation for detecting a data signal may include an operation for obtaining an estimated data signal by using an estimated channel value corresponding to a resource element to which the data signal is mapped. The decoder 260 may obtain a data signal to be transmitted from a base station to the terminal by descrambling and decoding a demodulated data signal.

According to some example embodiments, the receiver 200 may further include a terminal state information generator. The terminal status information generator may generate channel status information (e.g., CSI of FIG. 1) including at least one of moving speed information regarding a terminal and multi-path channel delay information regarding the terminal. The terminal status information generation unit may generate moving speed information by measuring a speed at which a current terminal is moving within a cell range of the base station (e.g., base station 10 of FIG. 1). Furthermore, the terminal status information generator may generate multi-path channel delay information regarding a downlink signal DLS that is received by a current terminal via other base stations or routers or received after being reflected by an object, such as a building. The terminal status information generation unit may periodically or non-periodically generate CSI and provide CSI to the base station. According to some example embodiments, the terminal state information generator may generate CSI every 5 ms and transmit the CSI to the base station.

The receiver 200 of the terminal according to some example embodiments is described above with reference to FIG. 6. However, the block configuration of the receiver 200 of the terminal shown in FIG. 6 is merely an example, and the receiver 200 of the terminal may have any of various block configurations according to various communication protocols other than the block configuration shown in FIG. 6.

Figure 7A:
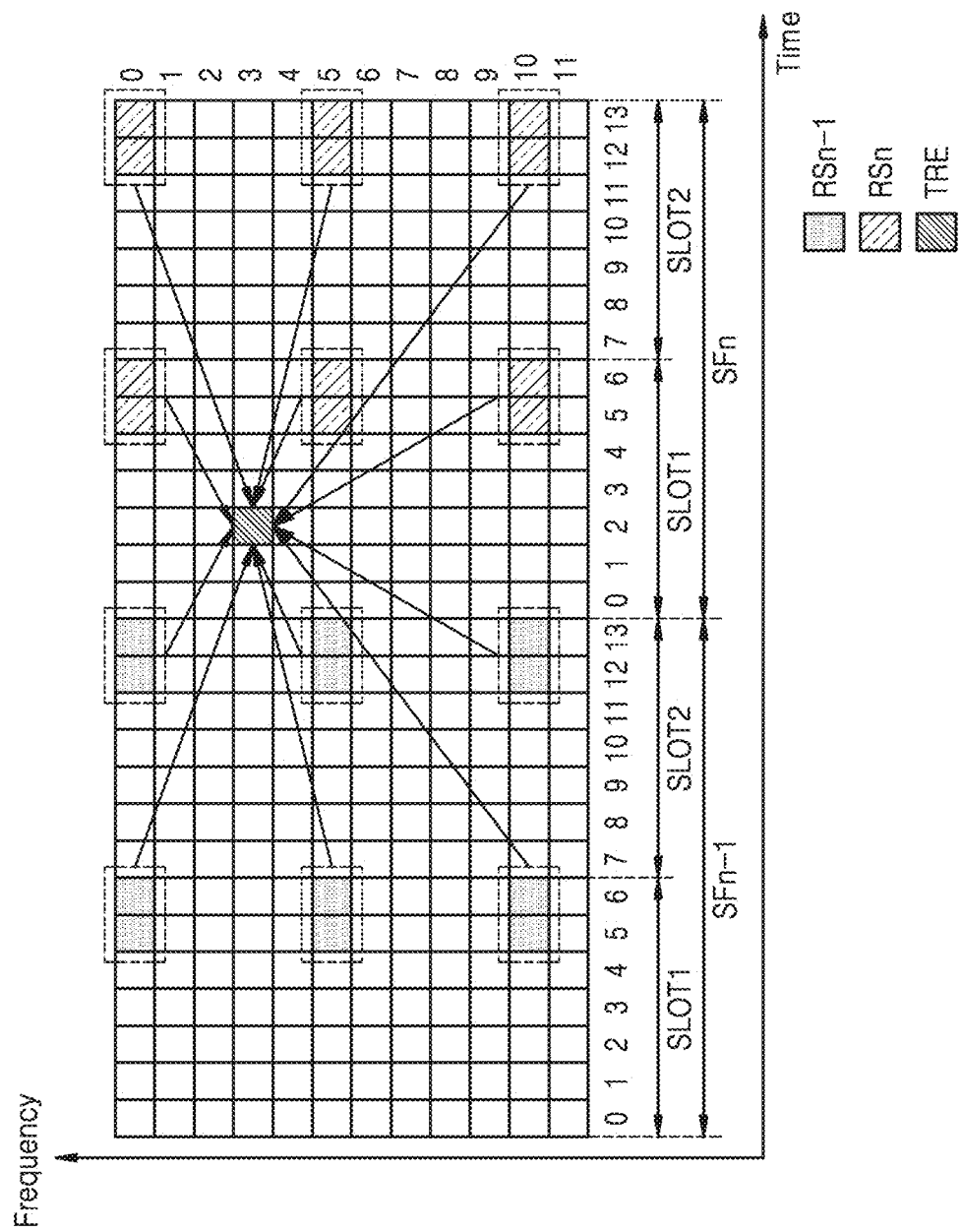
FIGS. 7A and 7B are diagrams showing specific examples of channel estimation methods based on reference signals included in two sub-frames, according to some example embodiments.
Figure 7B:
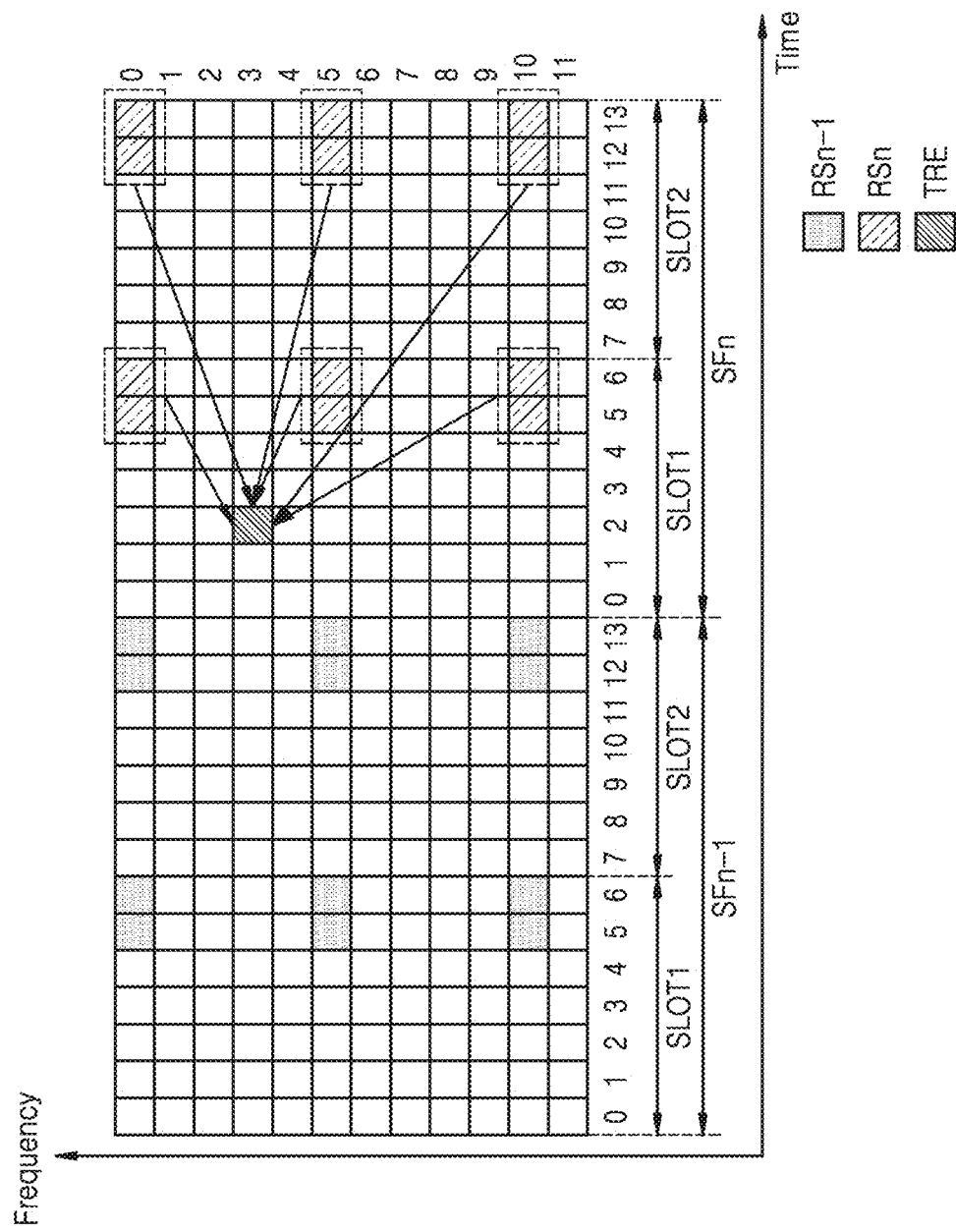

FIGS. 7A and 7B are diagrams showing specific examples of channel estimation methods according to some example embodiments. FIGS. 7A and 7B show an example of performing channel estimation based on all reference signals included in sub-frames. FIG. 7A shows a case where there is a pre-coding identity and FIG. 7B shows a case where there is no pre-coding identity.

Referring to FIG. 7A, when it is determined that a pre-coding matrix applied to the $n-1^{th}$ sub-frame SFn−1 is the same as a pre-coding matrix applied to the $n^{th}$ sub-frame SFn, channel estimation may be performed with respect to a target resource element TRE based on all of $n-1^{th}$ reference signals RSn−1 of the $n-1^{th}$ sub-frame SFn−1 and $n^{th}$ reference signals RSn of the $n^{th}$ sub-frame SFn.

Referring to FIG. 7B, when it is determined that a pre-coding matrix applied to the $n-1^{th}$ sub-frame SFn−1 is not the same as a pre-coding matrix applied to the $n^{th}$ sub-frame SFn, channel estimation may be performed with respect to a target resource element TRE based on the $n^{th}$ reference signals RSn of the $n^{th}$ sub-frame SFn.

Referring to FIGS. 7A and 7B, when it is determined that the pre-coding matrices applied to sub-frames adjacent to each other are the same as each other, during channel estimation performed with respect to a target resource element TRE, reference signals adjacent to a target resource element TRE and used for channel estimation are added, and thus channel estimation errors may be reduced.

Figure 8A:
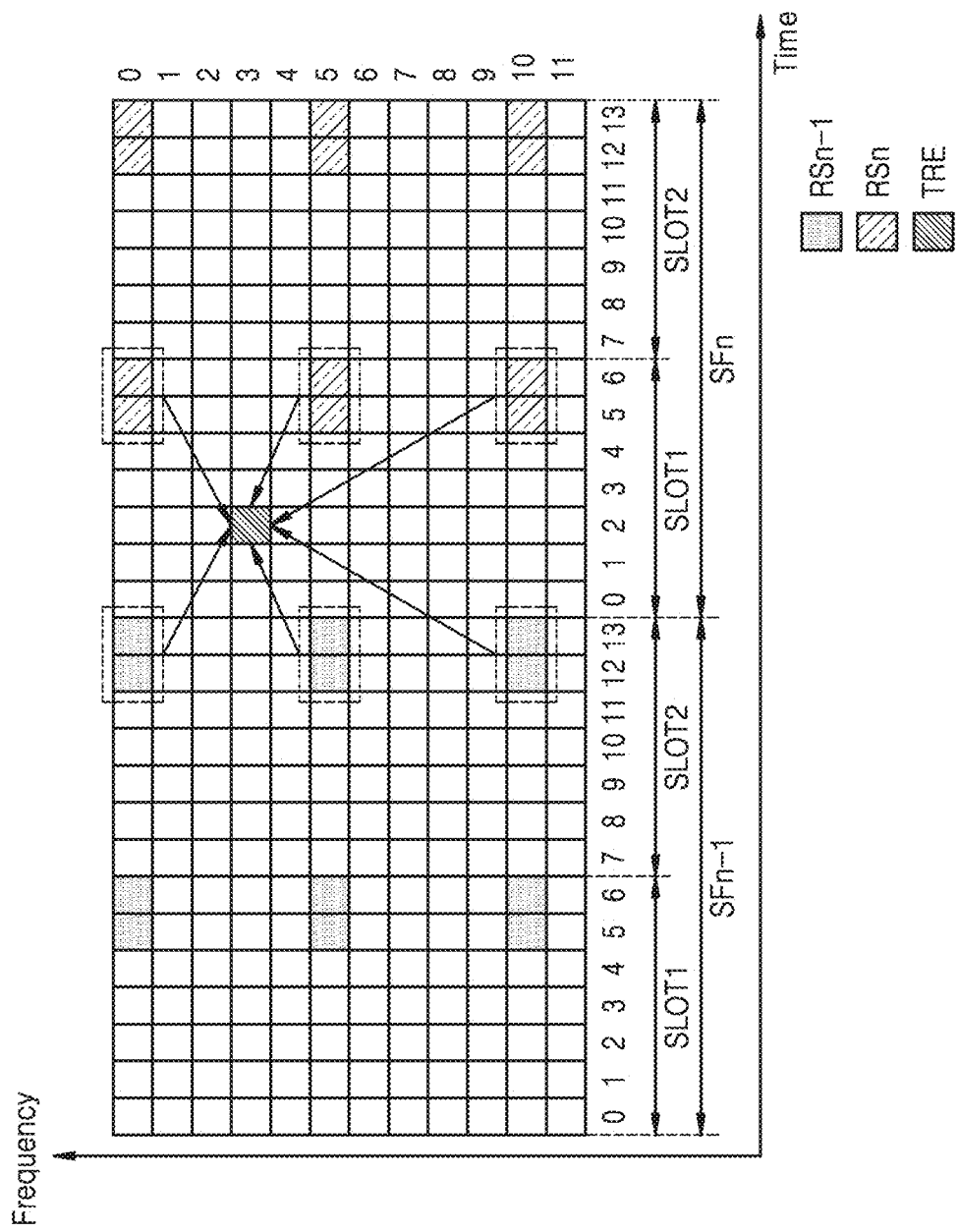
FIGS. 8A through 8C are diagrams showing specific examples of channel estimation methods based on reference signals included in two time slots, according to some example embodiments.
Figure 8B:
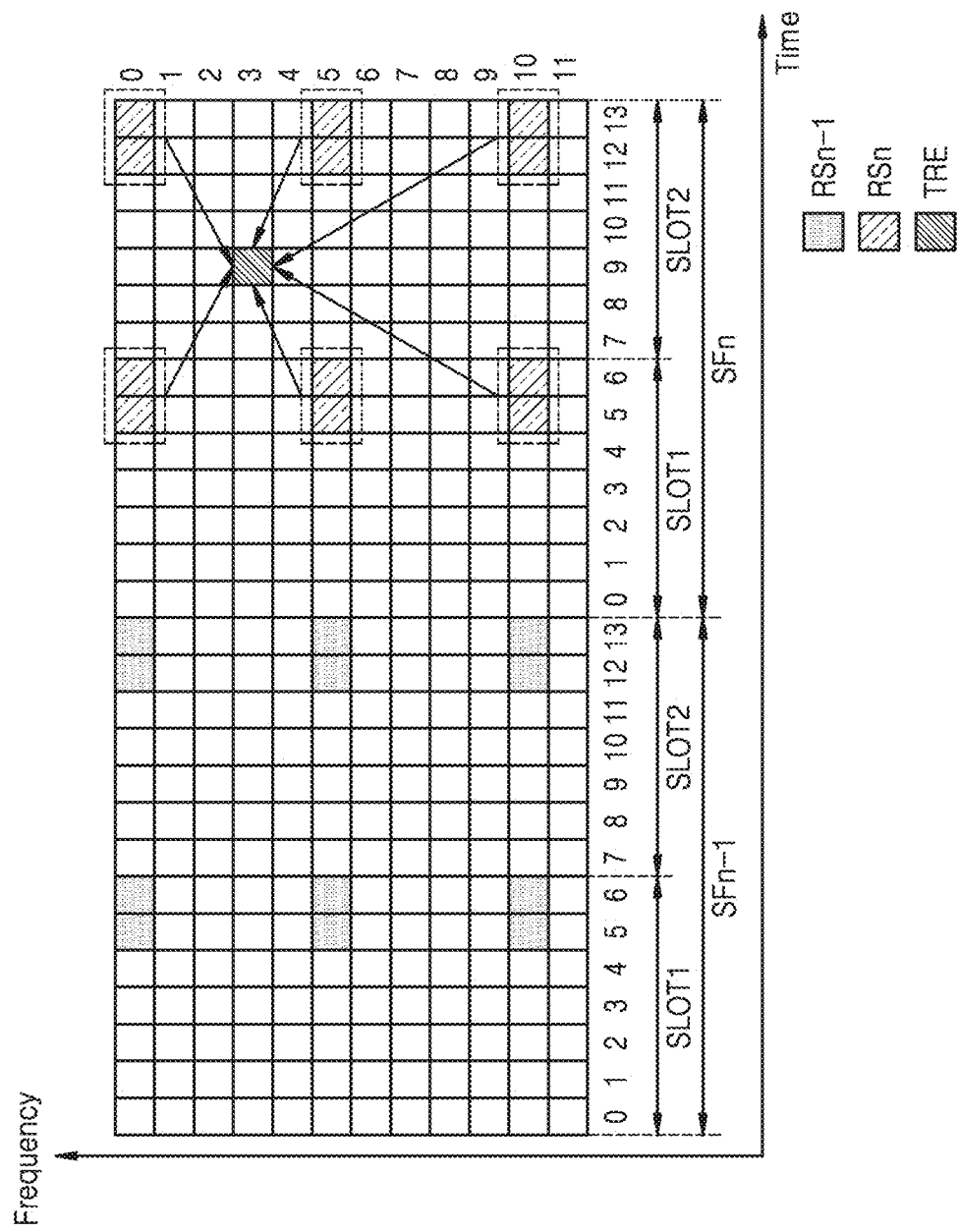
Figure 8C:
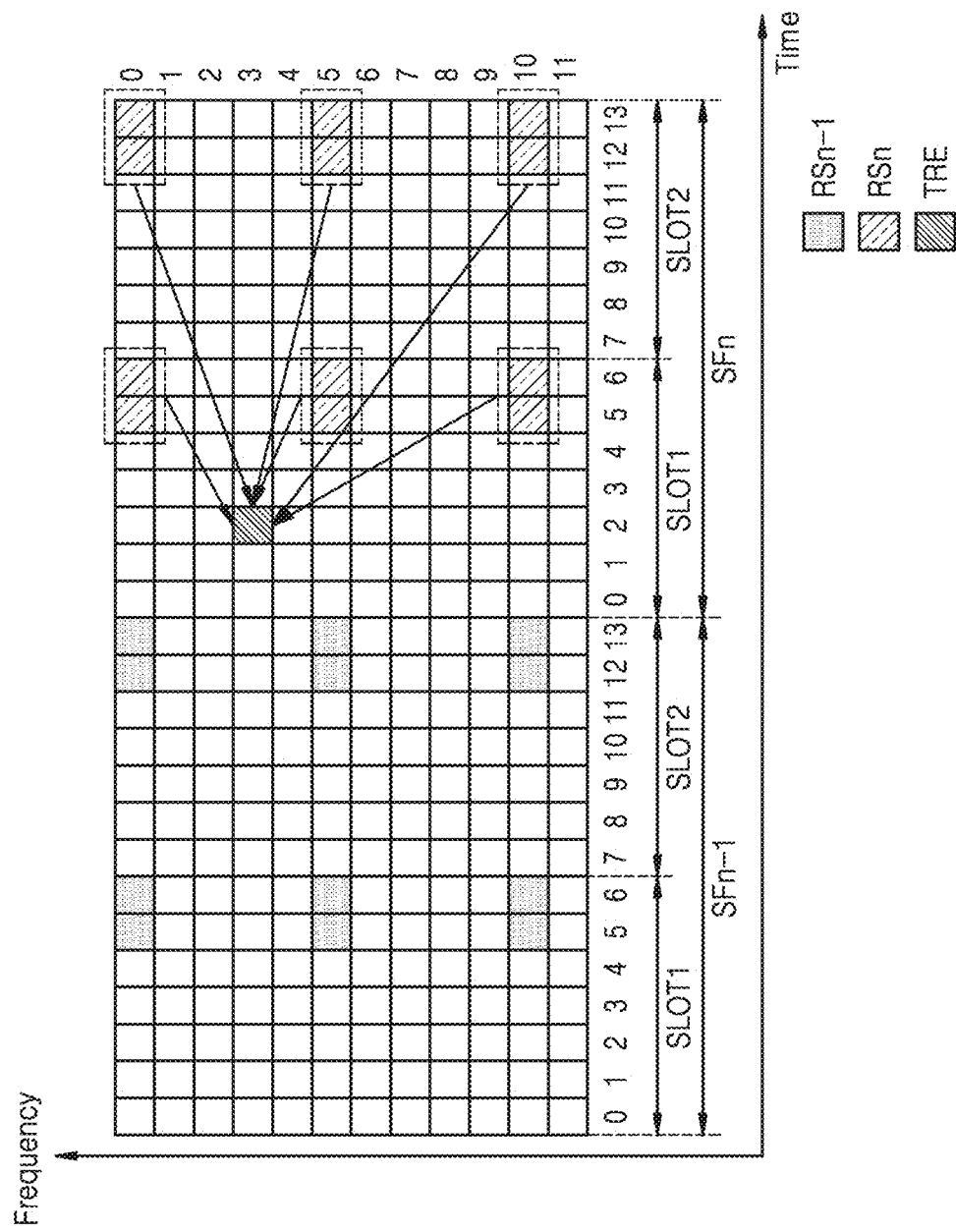

FIGS. 8A through 8C are diagrams showing specific examples of channel estimation methods according to some example embodiments. FIGS. 8A through 8C show examples of performing channel estimation based on reference signals included in two time slots including reference signals adjacent to a target resource element.

Referring to FIG. 8A, when it is determined that a pre-coding matrix applied to the $n-1^{th}$ sub-frame SFn−1 and a pre-coding matrix applied to the $n^{th}$ sub-frame SFn are the same as each other and a target resource element TRE is included in a first time slot SLOT1 of the $n^{th}$ sub-frame SFn, channel estimation may be performed with respect to the target resource element TRE based on some of the $n-1^{th}$ reference signals RSn−1, included in a second time slot SLOT2 of the $n-1^{th}$ sub-frame SFn−1 and some of the $n^{th}$ reference signals RSn, included in the first time slot SLOT1 of the $n^{th}$ sub-frame SFn.

Referring to FIG. 8B, when it is determined that a pre-coding matrix applied to the $n-1^{th}$ sub-frame SFn−1 and a pre-coding matrix applied to the $n^{th}$ sub-frame SFn are the same as each other and a target resource element TRE is included in the second time slot SLOT2 of the $n^{th}$ sub-frame SFn, channel estimation may be performed with respect to the target resource element TRE based on the $n^{th}$ reference signals RSn included in the first time slot SLOT1 and the second time slot SLOT2 of the $n^{th}$ sub-frame SFn.

Referring to FIG. 8C, when it is determined that a pre-coding matrix applied to the $n-1^{th}$ sub-frame SFn−1 and a pre-coding matrix applied to the $n^{th}$ sub-frame SFn are not the same as each other and a target resource element TRE is included in the first time slot SLOT1 of the $n^{th}$ sub-frame SFn, channel estimation may be performed with respect to the target resource element TRE based on the $n^{th}$ reference signals RSn included in the first time slot SLOT1 and the second time slot SLOT2 of the $n^{th}$ sub-frame SFn.

Meanwhile, when it is determined that a pre-coding matrix applied to the $n-1^{th}$ sub-frame SFn−1 and a precoding matrix applied to the $n^{th}$ sub-frame SFn are not the same as each other and a target resource element TRE is included in the second time slot SLOT2 of the $n^{th}$ sub-frame SFn, as shown in FIG. 8B, channel estimation may be performed with respect to the target resource element TRE based on the $n^{th}$ reference signals RSn included in the first time slot SLOT1 and the second time slot SLOT2 of the $n^{th}$ sub-frame SFn.

In other words, when it is determined that a pre-coding matrix applied to the $n-1^{th}$ sub-frame SFn-1 and a pre-coding matrix applied to the $n^{th}$ sub-frame SFn are the same as each other, channel estimation may be performed based on reference signals included in two time slots including reference signals adjacent to a target resource element TRE. When it is determined that a pre-coding matrix applied to the $n-1^{th}$ sub-frame SFn-1 and a pre-coding matrix applied to the $n^{th}$ sub-frame SFn are not the same as each other, channel estimation may be performed based on reference signals included a sub-frame to which a target resource element TRE belongs. As described above, according to some example embodiments, channel estimation errors may be reduced as channel estimation is performed based on reference signals adjacent to a target resource element in the time domain.

Figure 9:
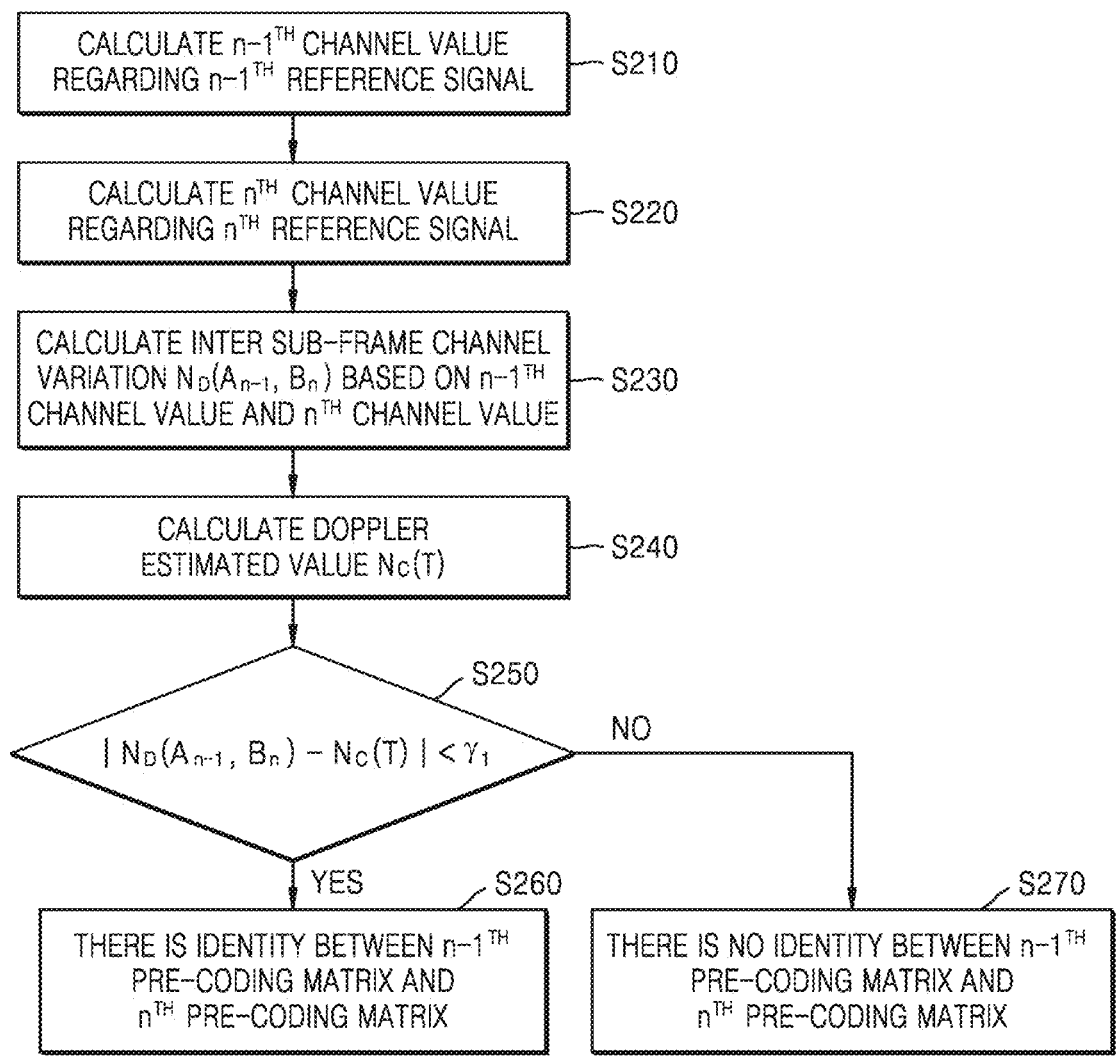
FIG. 9 is a flowchart showing methods of determining a pre-coding identity using a Doppler estimated value, according to some example embodiments.

FIG. 9 is a flowchart showing methods of determining a pre-coding identity using a Doppler estimated value, according to some example embodiments. The methods of FIG. 9 may be applied to a terminal (e.g., terminal 20 of FIG. 1). Therefore, the descriptions given above with reference to FIG. 1 may be applied to some example embodiments of FIG. 9.

Referring to FIG. 9, the terminal may calculate an $n-1^{th}$ channel value regarding an $n-1^{th}$ reference signal of an $n-1^{th}$ sub-frame (operation S210) and calculate an $n^{th}$ channel value regarding an $n^{th}$ reference signal of an $n^{th}$ sub-frame (operation S220). Channel values regarding reference signals may be calculated according to Equation 2. According to some example embodiments, operation S210 may be performed when the terminal receives the $n-1^{th}$ sub-frame, the $n-1^{th}$ channel value may then be stored in a storage area included in the terminal, and operation S220 may be performed when the terminal receives the $n^{th}$ sub-frame. According to some example embodiments, the operations S210 and S220 may be performed contemporaneously.

The terminal may calculate an inter sub-frame channel variation (ISCV) based on the $n-1^{th}$ channel value and the $n^{th}$ channel value (operation S230). The terminal may calculate an ISCV by applying the $n-1^{th}$ channel value and the $n^{th}$ channel value to Equation 3. Equation 3 indicates a normalized channel correlation $N_D(l_n, l_m)$.

$$N_D(l_n, l_m) \triangleq \frac{R(l_m - l_n)}{R(0)} = \frac{E\{\tilde{H}_i(k, l_n)\tilde{H}_i^*(k, l_m)\}}{E\{|\tilde{H}_i(k)|^2\}} \text{ for } m > n \quad \text{[Equation 3]}$$

Here, $R(l_m-l_n)$ denotes a correlation between two reference signals included in an mth sub-frame and an $n^{th}$ sub-frame, and R(0) denotes a self-correlation of a reference signal included in the mth sub-frame. $|\tilde{H}_i(k)|^2$ denotes a value obtained by averaging channel values of reference signals included in one subcarrier of the $n^{th}$ sub-frame and the mth sub-frame, and squaring the average value. E{X} denotes an estimated value of X and denotes an average value of X values calculated regarding respective subcarriers. According to some example embodiments, E{X} may denote an average value of X values calculated regarding respective subcarriers and respective layers.

The terminal may apply channel values of reference signals corresponding to the symbol index A of the $n-1^{th}$ sub-frame and channel values of reference signals corresponding to the symbol index B of the $n^{th}$ sub-frame to Equation 3, thereby obtaining $N_D(An-1, Bn)$ as an ISCV.

The terminal may calculate a Doppler estimated value (DEV) Nc(T) indicating the degree of a channel variation in the time domain based on the Doppler effect (operation S240). The terminal may obtain the channel variation Nc(T) corresponding to a time interval T between a reference signal corresponding to the symbol index A of the $n-1^{th}$ sub-frame and a reference signal corresponding to the symbol index B of the $n^{th}$ sub-frame as a DEV.

The terminal may compare a difference between the ISCV $N_D(An-1, Bn)$ and the DEV Nc(T) to a first critical value γ1 (operation S250). When the difference between the ISCV $N_D(An-1, Bn)$ and the DEV Nc(T) is less than the first critical value γ1, the terminal may determine that there is an identity between the $n-1^{th}$ pre-coding matrix applied to the $n-1^{th}$ sub-frame and the $n^{th}$ pre-coding matrix applied to the $n^{th}$ sub-frame (operation S260).

When the difference between the ISCV $N_D(An-1, Bn)$ and the DEV Nc(T) is equal to or greater than the first critical value γ1, the terminal may determine that there is no identity between the $n-1^{th}$ pre-coding matrix and the $n^{th}$ pre-coding matrix (operation S270).

Figure 10:
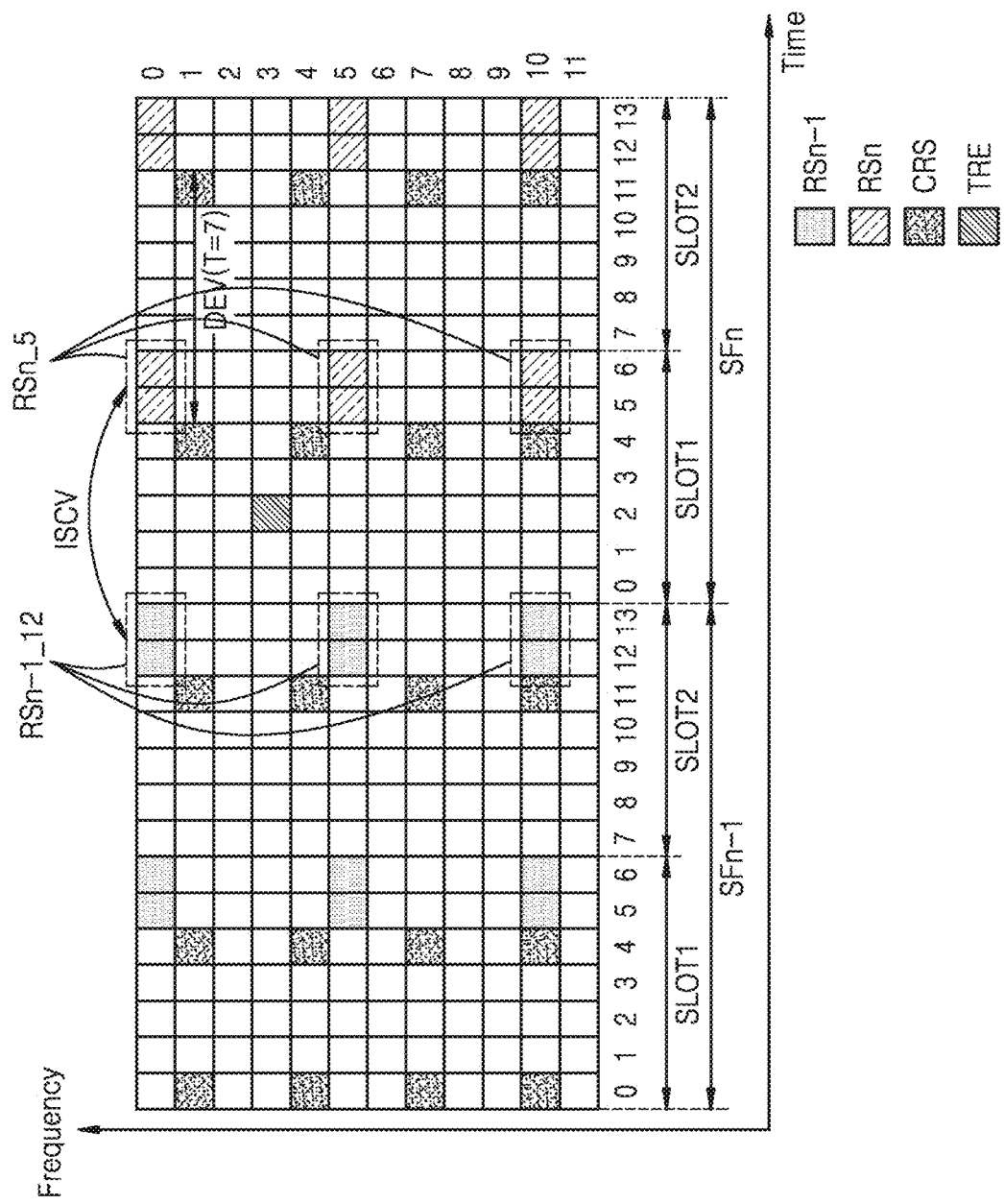
FIG. 10 is a diagram showing an example of the methods of determining a pre-coding identity of FIG. 9.

FIG. 10 is a diagram showing an example of the methods of determining a pre-coding identity of FIG. 9.

Referring to FIG. 10, based on $n-1^{th}$ reference signals RSn-1_12 corresponding to the symbol indices 12 and 13 of the $n-1^{th}$ sub-frame SFn-1 and $n^{th}$ reference signals RSn_5 corresponding to the symbol indices 5 and 6 of the $n^{th}$ sub-frame SFn, a terminal (e.g., terminal 20 of FIG. 1) may calculate a channel variation $N_D(12n-1, 5n)$ between the signals. The terminal may obtain the channel variation $N_D(12n-1, 5n)$ as an ISCV between the $n-1^{th}$ sub-frame SFn-1 and the $n^{th}$ sub-frame SFn.

Time intervals (or symbol intervals) of the $n-1^{th}$ reference signals RSn-1_12 and the $n^{th}$ reference signals RSn_5 may correspond to intervals of 7 symbols. Therefore, the terminal may calculate a channel variation NC(7) based on the Doppler effect regarding the time interval corresponding to 7 symbols as a DEV. According to some example embodiments, each of the sub-frames SFn-1 and SFn may include a plurality of CRSs and the terminal may calculate the DEV based on CRSs corresponding to the symbol indices 4 and 11. Although FIG. 10 shows that a DEV is calculated based on CRSs included in the $n^{th}$ sub-frame SFn, some example embodiments are not limited thereto, and a DEV may also be calculated based on CRSs included in the $n-1^{th}$ sub-frame SFn-1.

When a difference between the ISCV $N_D(12n-1, 5n)$ and the DEV NC(7) is less than the first critical value γ1, the terminal may determine that there is a pre-coding identity between the $n-1^{th}$ sub-frame and the $n^{th}$ sub-frame. In other words, the terminal may determine that a pre-coding is maintained for two successive sub-frames SFn-1 and SFn.

When $|N_D(12n-1, 5n)-NC(7)|$ is equal to or greater than the first critical value γ1, the terminal may determine that there is no pre-coding identity between the $n-1^{th}$ sub-frame SFn-1 and the $n^{th}$ sub-frame SFn. In other words, the terminal may determine that no pre-coding is maintained for two successive sub-frames SFn-1 and SFn.

Figure 11:
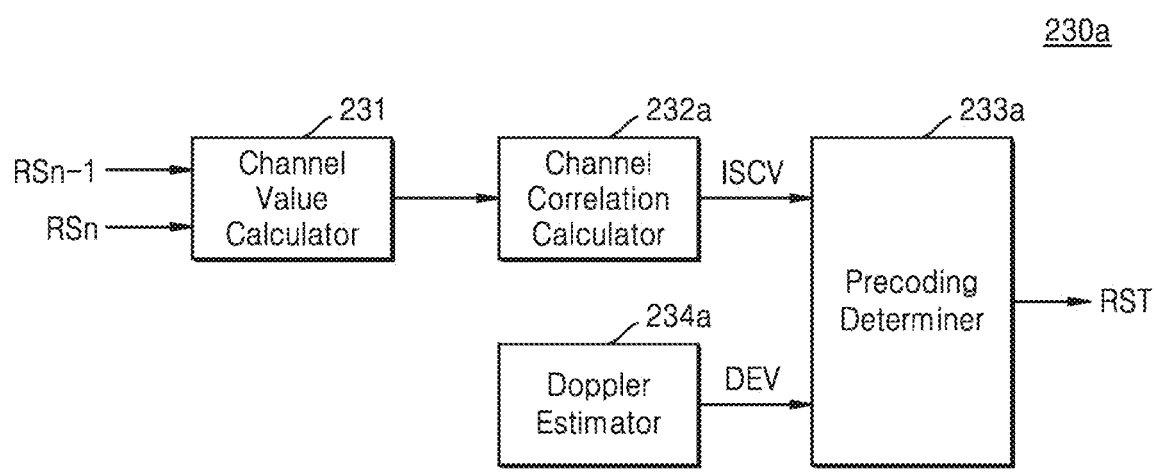
FIG. 11 is a block diagram showing an implementation of a pre-coding detector including a Doppler detector, according to some example embodiments.

FIG. 11 is a block diagram showing an implementation of a pre-coding detector including a Doppler detector, according to some example embodiments. The methods of determining pre-coding identity described above with reference to FIGS. 9 and 10 may be performed by a pre-coding detector 230a of FIG. 11. Therefore, the descriptions given above with reference to FIGS. 9 and 10 may be applied to the pre-coding detector 230a of FIG. 11.

Referring to FIG. 11, the pre-coding detector 230a may include a channel value calculator 231, a channel correlation calculator 232a, a Doppler detector 234a (depicted as Doppler estimator), and a pre-coding determiner 233a. Any or all of the components included in the pre-coding detector 230a (e.g., the channel value calculator 231, the channel correlation calculator 232a, the Doppler detector 234a, and the pre-coding determiner 233a) a may be a hardware block including an analog circuit and/or a digital circuit or may be a software block including a plurality of instructions executable by a processor or the like. Operations described herein as being performed by any or all of the channel value calculator 231, the channel correlation calculator 232a, the Doppler detector 234a, and the pre-coding determiner 233a may be performed by at least one processor executing program code that includes instructions stored in a memory corresponding to the operations.

The channel value calculator 231 may receive the $n-1^{th}$ reference signals RSn-1 of the $n-1^{th}$ sub-frame and the $n^{th}$ reference signals RSn of the $n^{th}$ sub-frame and calculate channel values regarding the respective reference signals RSn-1 and RSn.

The channel correlation calculator 232a may calculate a channel correlation $N_D(ln, lm)$ based on Equation 3. The channel correlation calculator 232a may calculate an ISCV between the $n-1^{th}$ sub-frame and the $n^{th}$ sub-frame based on Equation 3.

The Doppler detector 234a may estimate a moving speed of the terminal (e.g., terminal 20 of FIG. 1) and calculate a channel variation in the time domain due the Doppler effect. This may be referred to as a Doppler estimated value (DEV). For example, the Doppler detector 234a may calculate a channel variation in the time domain based on CRS.

The pre-coding determiner 233a may determine a pre-coding identity between the $n-1^{th}$ sub-frame and the $n^{th}$ sub-frame based on the ISCV and the DEV and output a determined result (RST). For example, the RST may be provided to a channel estimator (e.g., channel estimator 22 of FIG. 1 and channel estimator 240 of FIG. 6).

According to some example embodiments, when a difference between the ISCV and the DEV is less than a critical value, e.g., the first critical value γ1, the pre-coding determiner 233a may determine that there is a pre-coding identity. When a difference between the ISCV and the DEV is equal to or greater than the critical value, the pre-coding determiner 233a may determine that there is no pre-coding identity. Here, the critical value may be a value set based on experimental data or selected by a designer. The critical value may be set in advance during a process for manufacturing or initializing the terminal, or may be updated while the terminal is being used.

Figure 12:
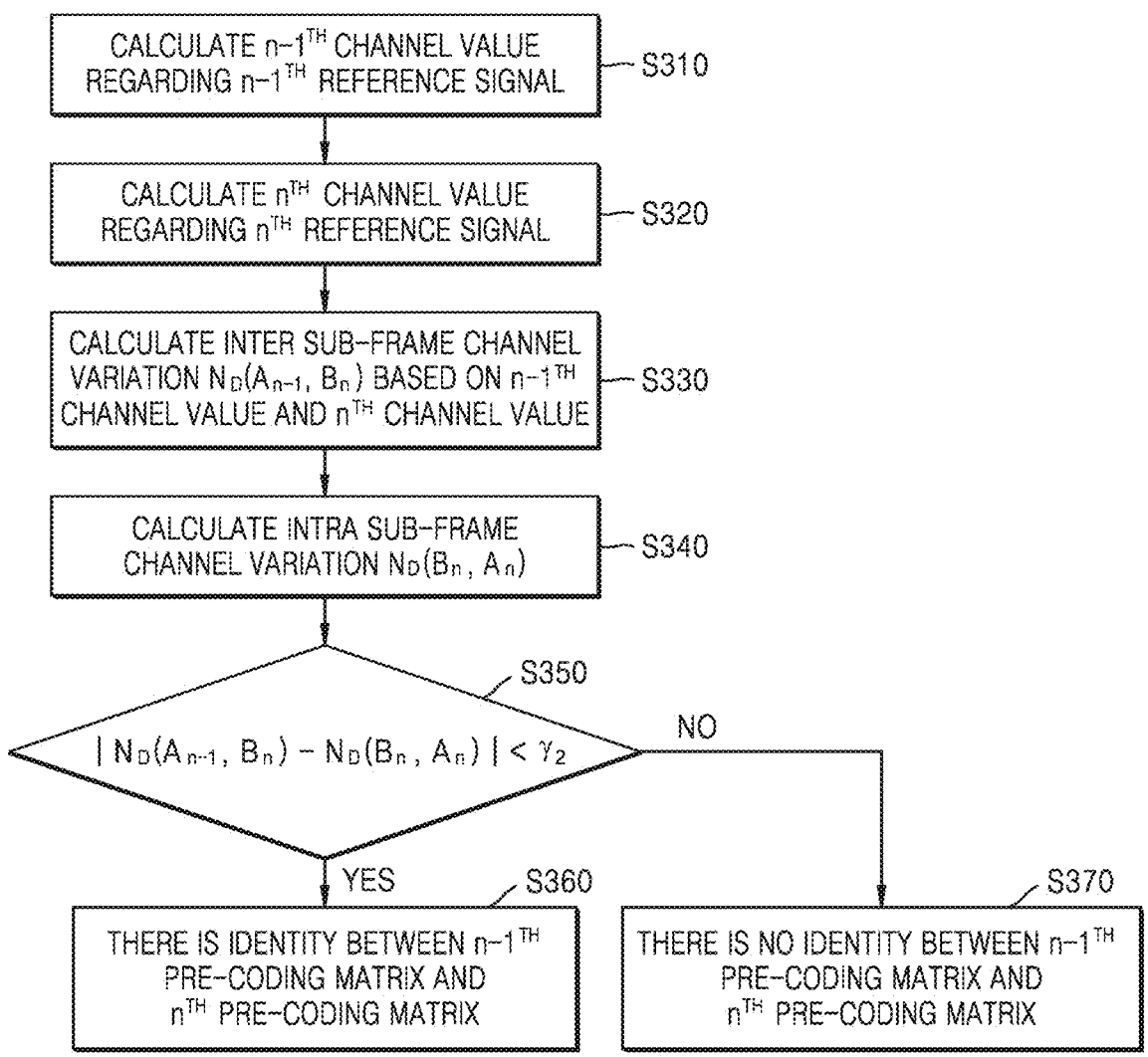
FIG. 12 is a flowchart showing methods of determining a pre-coding identity including calculating an intra sub-frame channel variation, according to some example embodiments.

FIG. 12 is a flowchart showing methods of determining a pre-coding identity including calculating an intra sub-frame channel variation, according to some example embodiments. The methods of FIG. 12 may be applied to a terminal (e.g., terminal 20 of FIG. 1). Therefore, the descriptions given above with reference to FIG. 1 may be applied to some example embodiments of FIG. 12.

Referring to FIG. 12, the terminal may calculate an $n-1^{th}$ channel value regarding an $n-1^{th}$ reference signal of an $n-1^{th}$ sub-frame (operation S310) and calculate an $n^{th}$ channel value regarding an $n^{th}$ reference signal of an $n^{th}$ sub-frame (operation S320). Furthermore, the terminal may calculate an ISCV $N_D(An-1, Bn)$ based on the $n-1^{th}$ channel value and the $n^{th}$ channel value (operation S330). The operations S310, S320, and S330 of FIG. 12 are similar to the operations S210, S220, and S230 of FIG. 9, and thus detailed descriptions thereof will be omitted.

The terminal may calculate an intra sub-frame channel variation (IRSCVn) $N_D(Bn, An)$ regarding the $n^{th}$ sub-frame based on the $n^{th}$ channel value (operation S340). The terminal may calculate the IRSCVn regarding the $n^{th}$ sub-frame by applying channel values of reference symbols corresponding to different symbol indices from among the $n^{th}$ channel values to Equation 3. For example, the terminal may apply a channel value of reference signals corresponding to the symbol index B of the $n^{th}$ sub-frame and a channel value of reference signals corresponding to the symbol index A of the $n^{th}$ sub-frame to Equation 3, thereby obtaining $N_D(Bn, An)$ as an IRSCVn regarding the $n^{th}$ sub-frame.

The terminal may compare a difference between the ISCV $N_D(An-1, Bn)$ and the IRSCVn $N_D(Bn, An)$ to a second critical value γ2 (operation S350). When the difference between the ISCV $N_D(An-1, Bn)$ and the IRSCVn $N_D(Bn, An)$ is less than the second critical value γ2, the terminal may determine that there is an identity between an $n-1^{th}$ pre-coding matrix applied to the $n-1^{th}$ sub-frame and an $n^{th}$ pre-coding matrix applied to the $n^{th}$ sub-frame (operation S360).

When the difference between the ISCV $N_D(An-1, Bn)$ and the IRSCVn $N_D(Bn, An)$ is equal to or greater than the second critical value γ2, the terminal may determine that there is no identity between the $n-1^{th}$ pre-coding matrix and the $n^{th}$ pre-coding matrix (operation S370).

Figure 13:
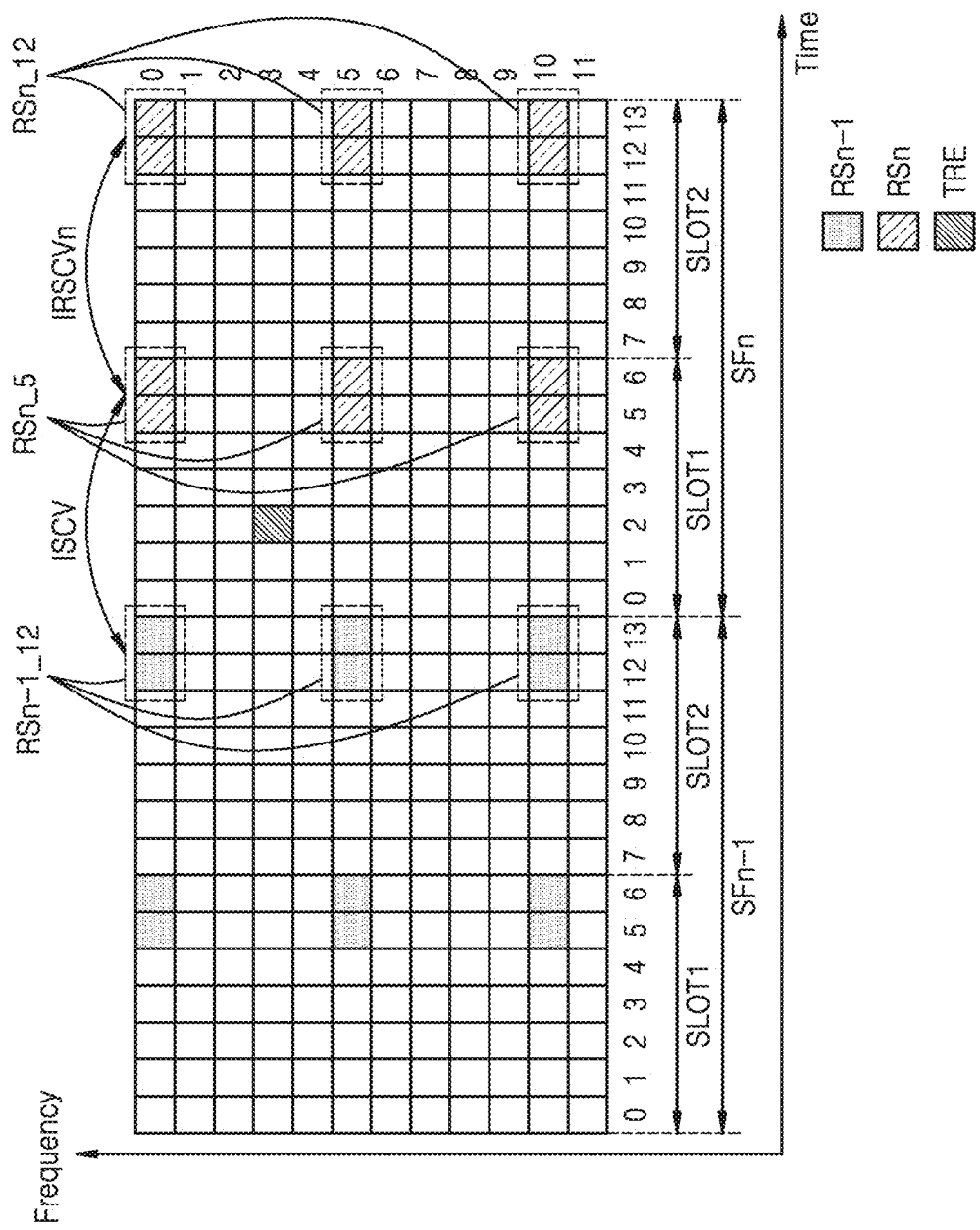
FIG. 13 is a diagram showing an example of the methods of determining a pre-coding identity of FIG. 12.

FIG. 13 is a diagram showing an example of the methods of determining a pre-coding identity of FIG. 12.

Referring to FIG. 13, based on $n-1^{th}$ reference signals RSn-1_12 corresponding to the symbol indices 12 and 13 of the $n-1^{th}$ sub-frame SFn-1 and $n^{th}$ reference signals RSn_5 corresponding to the symbol indices 5 and 6 of the $n^{th}$ sub-frame SFn, the terminal (e.g., terminal 20 of FIG. 1) may calculate a channel variation $N_D(12n-1, 5n)$ between the signals. The terminal may obtain the channel variation $N_D(12n-1, 5n)$ as an ISCV between the $n-1^{th}$ sub-frame SFn-1 and the $n^{th}$ sub-frame SFn.

Based on $n^{th}$ reference signals RSn_5 corresponding to the symbol indices 5 and 6 of the $n^{th}$ sub-frame SFn and $n^{th}$ reference signals RSn_12 corresponding to the symbol indices 12 and 13 of the $n^{th}$ sub-frame SFn, the terminal may calculate a channel variation $N_D(5n, 12n)$ between the signals. The terminal may obtain the channel variation $N_D(5n, 12n)$ as an IRSCVn regarding the $n^{th}$ sub-frame SFn. When a difference between the ISCV $N_D(12n-1, 5n)$ and the IRSCVn $N_D(5n, 12n)$, that is, $|N_D(12n-1, 5n)-N_D(5n, 12n)|$ is less than the second critical value γ2, the terminal may determine that there is a pre-coding identity between the $n-1^{th}$ sub-frame SFn-1 and the $n^{th}$ sub-frame SFn. In other words, the terminal may determine that a pre-coding is maintained for two successive sub-frames SFn-1 and SFn.

When $|N_D(12n-1, 5n)-N_D(5n, 12n)|$ is equal to or greater than the second critical value γ2, the terminal may determine that there is no pre-coding identity between the $n-1^{th}$ sub-frame SFn-1 and the $n^{th}$ sub-frame SFn. In other words, the terminal may determine that no pre-coding is maintained for two successive sub-frames SFn-1 and SFn.

Figure 14:
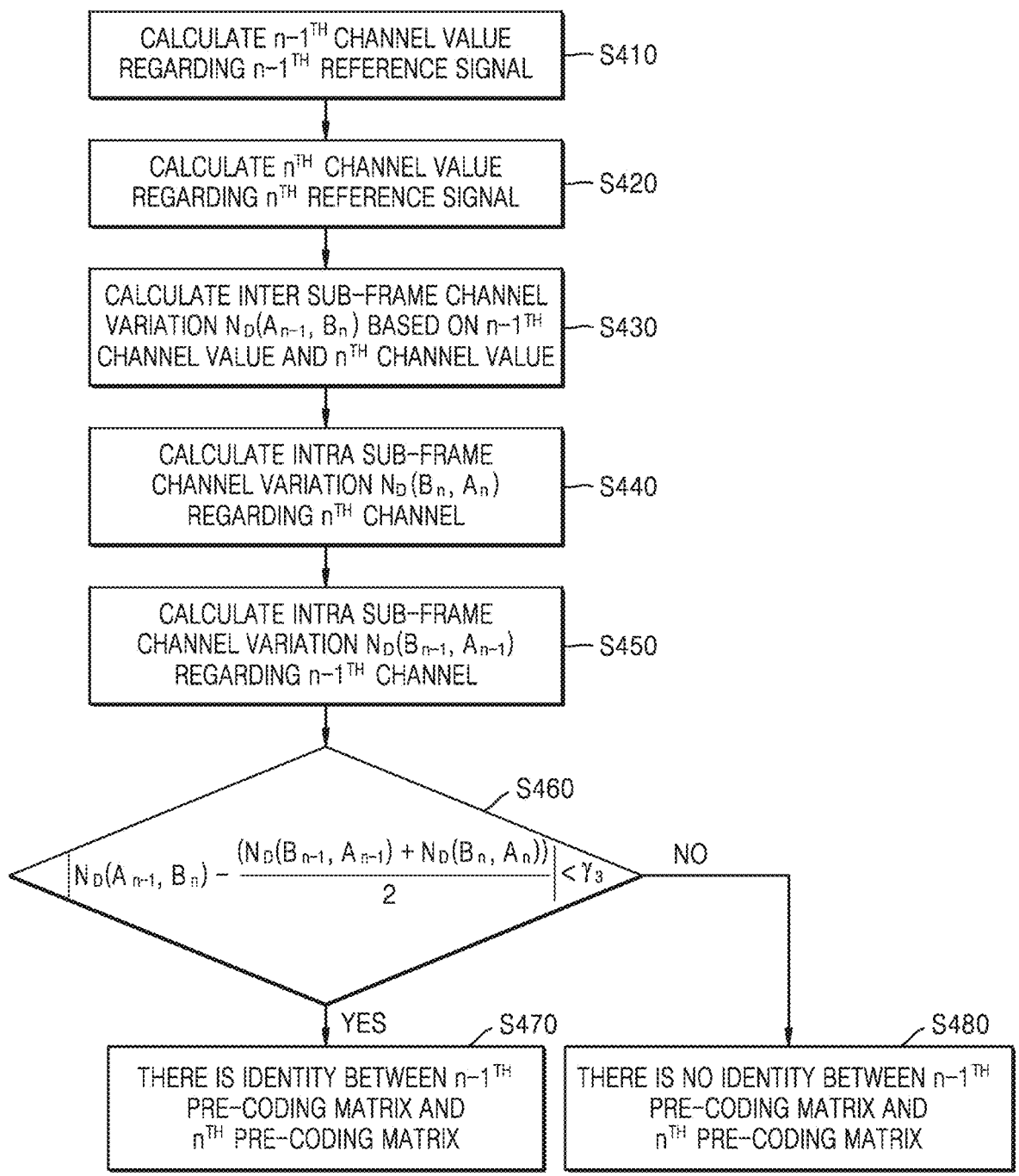
FIG. 14 is a flowchart showing methods of determining a pre-coding identity including calculating a plurality of intra sub-frame channel variations, according to some example embodiments.

FIG. 14 is a flowchart showing methods of determining a pre-coding identity including calculating a plurality of intra sub-frame channel variations, according to some example embodiments. The methods of FIG. 14 may be applied to a terminal (e.g., terminal 20 of FIG. 1). Therefore, the descriptions given above with reference to FIG. 1 may be applied to some example embodiments of FIG. 14.

Referring to FIG. 14, the terminal may calculate an $n-1^{th}$ channel value regarding an $n-1^{th}$ reference signal of an $n-1^{th}$ sub-frame (operation S410) and calculate an $n^{th}$ channel value regarding an $n^{th}$ reference signal of an $n^{th}$ sub-frame (operation S420). Furthermore, the terminal may calculate an ISCV $N_D(An-1, Bn)$ based on the $n-1^{th}$ channel value and the $n^{th}$ channel value (operation S430) and calculate an IRSCVn $N_D(Bn, An)$ regarding the $n^{th}$ sub-frame based on the $n^{th}$ channel value (operation S440). The operations S410, S420, S430, and S440 of FIG. 14 are similar to the operations S310, S320, S330, and S340 of FIG. 12, and thus detailed descriptions thereof will be omitted.

The terminal may also calculate an IRSCVn-1 $N_D(Bn-1, An-1)$ regarding the $n-1^{th}$ sub-frame based on the $n-1^{th}$ channel value (operation S450). The terminal may calculate the IRSCVn-1 regarding the $n-1^{th}$ sub-frame by applying channel values of reference symbols corresponding to different symbol indices from among the $n-1^{th}$ channel values to Equation 3. For example, the terminal may apply a channel value of reference signals corresponding to the symbol index B of the $n-1^{th}$ sub-frame and a channel value of reference signals corresponding to the symbol index A of the $n-1^{th}$ sub-frame to Equation 3, thereby obtaining $N_D(Bn-1, An-1)$ as an IRSCVn-1 regarding the $n-1^{th}$ sub-frame.

The terminal may compare the ISCV $N_D(An-1, Bn)$ with an average value of intra sub-frame channel variations (operation S460). The terminal may calculate an average value of the IRSCVn $N_D(Bn, An)$ regarding the $n^{th}$ sub-frame and the IRSCVn-1 $N_D(Bn-1, An-1)$ regarding the $n-1^{th}$ sub-frame and compare a difference between the average value and the ISCV $N_D(An-1, Bn)$ with a third critical value γ3.

When the difference between ISCV $N_D(An-1, Bn)$ and the average value is less than the third critical value γ3, the terminal may determine that there is an identity between the $n-1^{th}$ pre-coding matrix applied to the $n-1^{th}$ sub-frame and the $n^{th}$ pre-coding matrix applied to the $n^{th}$ sub-frame (operation S470).

When the difference between ISCV $N_D(An-1, Bn)$ and the average value is equal to or greater than the third critical value γ3, the terminal may determine that there is no identity between the $n-1^{th}$ pre-coding matrix and the $n^{th}$ pre-coding matrix (operation S480)

Figure 15:
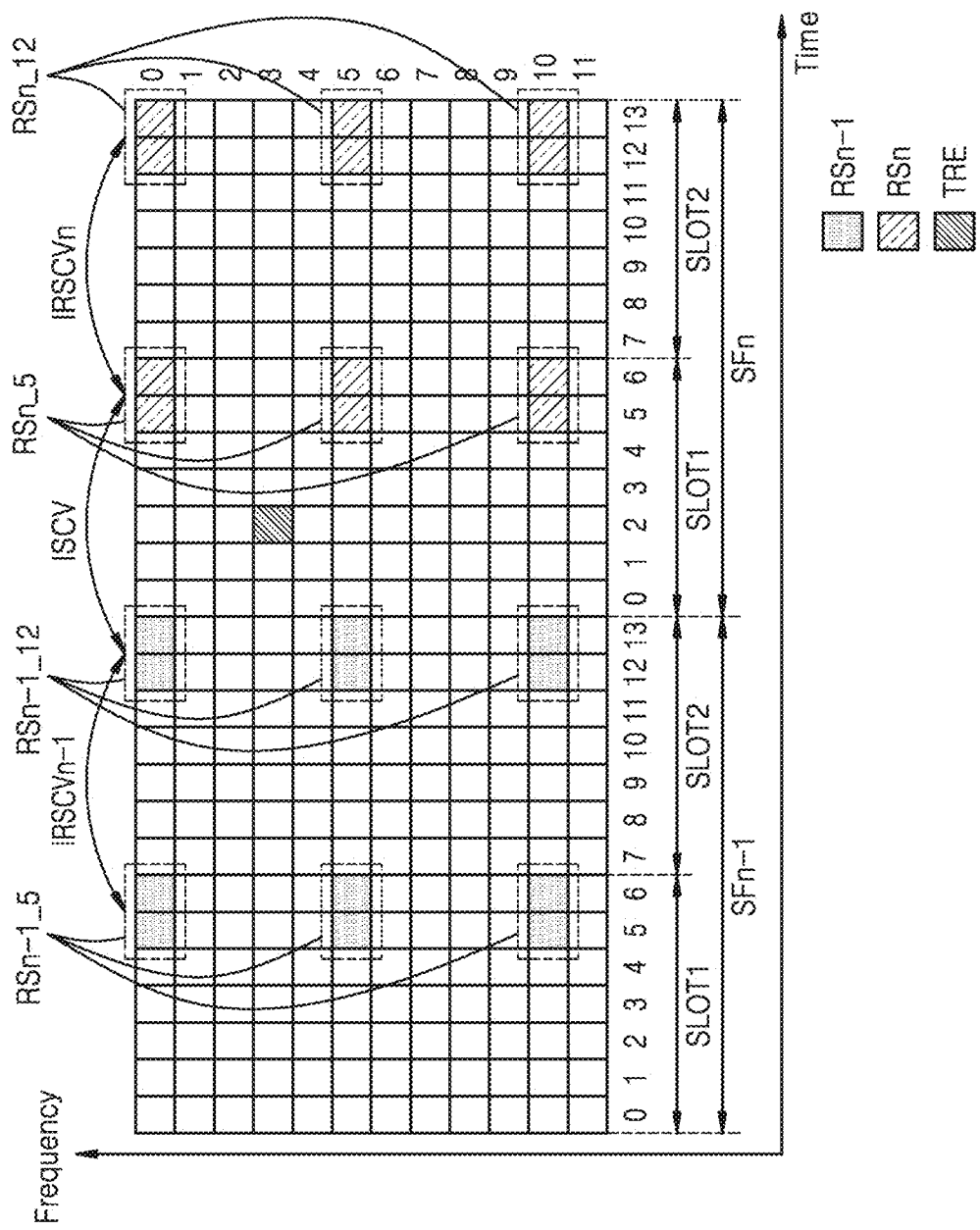
FIG. 15 is a diagram showing an example of the methods of determining a pre-coding identity of FIG. 14.

FIG. 15 is a diagram showing an example of the methods of determining a pre-coding identity of FIG. 14.

Referring to FIG. 15, based on $n-1^{th}$ reference signals RSn-1_12 corresponding to the symbol indices 12 and 13 of the $n-1^{th}$ sub-frame SFn-1 and $n^{th}$ reference signals RSn_5 corresponding to the symbol indices 5 and 6 of the $n^{th}$ sub-frame SFn, the terminal (e.g., terminal 20 of FIG. 1) may calculate a channel variation $N_D(12n-1, 5n)$ between the signals. The terminal may obtain the channel variation $N_D(12n-1, 5n)$ as an ISCV between the $n-1^{th}$ sub-frame SFn-1 and the $n^{th}$ sub-frame SFn.

Based on $n^{th}$ reference signals RSn_5 corresponding to the symbol indices 5 and 6 of the $n^{th}$ sub-frame SFn and $n^{th}$ reference signals RSn_12 corresponding to the symbol indices 12 and 13 of the $n^{th}$ sub-frame SFn, the terminal may calculate a channel variation $N_D(5n, 12n)$ between the signals as an IRSCVn regarding the $n^{th}$ sub-frame SFn.

Furthermore, based on $n-1^{th}$ reference signals RSn-1_5 corresponding to the symbol indices 5 and 6 of the $n-1^{th}$ sub-frame SFn-1 and $n-1^{th}$ reference signals RSn-1_12 corresponding to the symbol indices 12 and 13 of the $n-1^{th}$ sub-frame SFn-1, the terminal may calculate a channel variation $N_D(5n-1, 12n-1)$ between the signals as an IRSCVn-1 regarding the $n-1^{th}$ sub-frame SFn-1.

The terminal calculates an average value of intra sub-frame channel variations regarding the $n-1^{th}$ sub-frame SFn-1 and the $n^{th}$ sub-frame SFn, that is, $(N_D(5n-1, 12n-1)+N_D(5n, 12n))/2$. When a difference between the ISCV $N_D(12n-1, 5n)$ and the average value of the intra sub-frame channel variations is less than a third critical value γ3, the terminal may determine that there is a pre-coding identity between the $n-1^{th}$ sub-frame SFn-1 and the $n^{th}$ sub-frame SFn.

When $|N_D(12n-1, 5n)-(N_D(5n-1, 12n-1)+N_D(5n, 12n))/2|$ is equal to or greater than the third critical value γ3, the terminal may determine that there is no pre-coding identity between the $n-1^{th}$ sub-frame SFn-1 and the $n^{th}$ sub-frame SFn.

Figure 16:
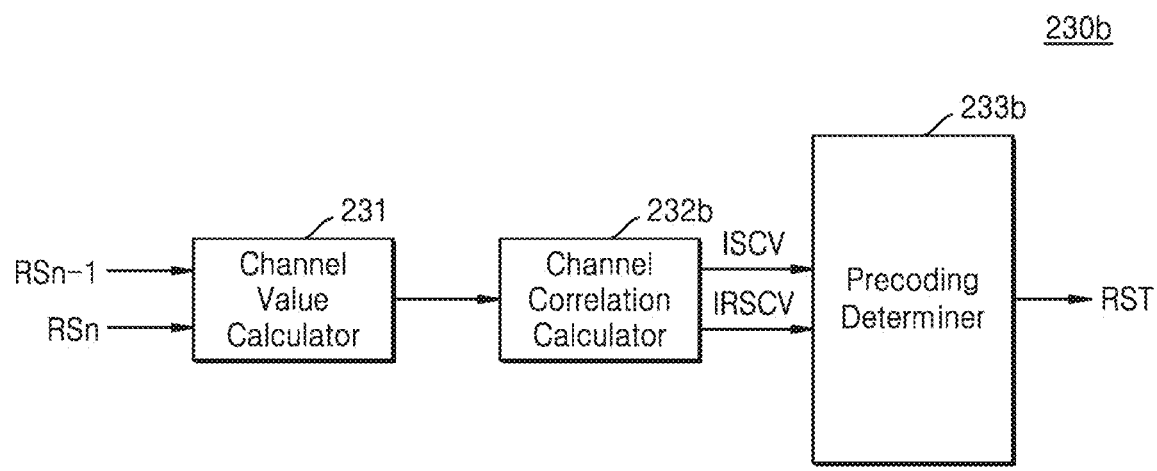
FIG. 16 is a block diagram showing an implementation of a pre-coding detector according to some example embodiments.

FIG. 16 is a block diagram showing an implementation of a pre-coding detector according to some example embodiments. The methods of determining a pre-coding identity described with reference to FIGS. 12 through 15 may be performed by a pre-coding detector 230b of FIG. 16. Therefore, the descriptions given above with reference to FIGS. 12 through 15 may be applied to the pre-coding detector 230b of FIG. 16.

Referring to FIG. 16, the pre-coding detector 230b may include a channel value calculator 231, a channel correlation calculator 232b, and a pre-coding determiner 233b. Any of all of the components of the pre-coding detector 230b (e.g., the channel value calculator 231, the channel correlation calculator 232b, and the pre-coding determiner 233b) may be a hardware block including an analog circuit and/or a digital circuit, and may be a software block including a plurality of instructions that are executed by a processor or the like. Operations described herein as being performed by any or all of the channel value calculator 231, the channel correlation calculator 232b, and the pre-coding determiner 233b may be performed by at least one processor executing program code that includes instructions stored in a memory corresponding to the operations.

The channel value calculator 231 may receive $n-1^{th}$ reference signals RSn-1 of the $n-1^{th}$ sub-frame and $n^{th}$ reference signals RSn of the $n^{th}$ sub-frame and calculate channel values regarding respective reference signals RSn-1 and RSn.

The channel correlation calculator 232b may calculate a channel correlation $N_D(\text{ln}, \text{lm})$ based on Equation 3. The channel correlation calculator 232b may calculate an ISCV between the $n-1^{th}$ sub-frame and the $n^{th}$ sub-frame based on Equation 3. Furthermore, the channel correlation calculator 232b may calculate an IRSCV. According to some example embodiments, the channel correlation calculator 232b may calculate an IRSCVn regarding the $n^{th}$ sub-frame. According to some example embodiments, the channel correlation calculator 232b may calculate an IRSCVn regarding the $n^{th}$ sub-frame and an IRSCVn-1 regarding the $n-1^{th}$ sub-frame.

The pre-coding determiner 233b may determine a pre-coding identity between the $n-1^{th}$ sub-frame and the $n^{th}$ sub-frame based on the ISCV and the IRSCV. According to some example embodiments, the pre-coding determiner 233b may determine that there is a pre-coding identity when a difference between the ISCV and the IRSCVn regarding the $n^{th}$ sub-frame is less than a critical value, e.g., the second critical value γ2, and may determine that there is no pre-coding identity when the difference between the ISCV and the IRSCVn regarding the $n^{th}$ sub-frame is equal to or greater than the critical value.

According to some example embodiments, the pre-coding determiner 233b may determine that there is a pre-coding identity when differences between the ISCV and intra sub-frame channel variations are less than a critical value, e.g., the third critical value γ3, and may determine that there is no pre-coding identity when the differences between the ISCV and the intra sub-frame channel variations are equal to or greater than the critical value.

Methods of determining a pre-coding identity according to some example embodiments have been described above with reference to FIGS. 9 through 16. However, the above description is merely an example of methods for determining a pre-coding identity, and some example embodiments are not limited thereto. Various modifications may be made in the methods of determining a pre-coding identity according to some example embodiments within the technical range for determining a pre-coding identity between sub-frames based on a channel variation in the time domain, and more particularly, a channel variation between sub-frames adjacent to each other.

Figure 17:
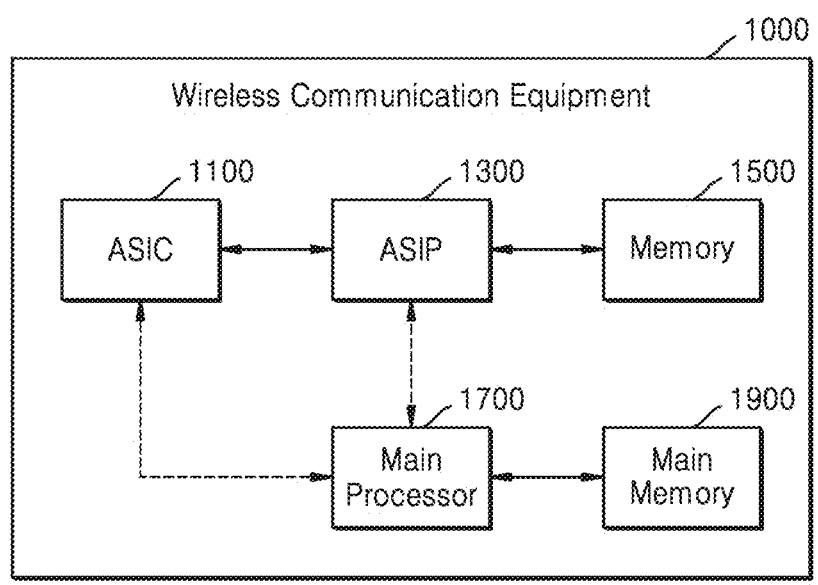
FIG. 17 is a block diagram showing a wireless communication apparatus according to some example embodiments.

FIG. 17 is a block diagram showing a wireless communication apparatus 1000 according to some example embodiments. As shown in FIG. 17, the wireless communication apparatus 1000 may include an application-specific integrated circuit (ASIC) 1100, an application-specific instruction set processor (ASIP) 1300, a memory 1500, a main processor 1700, and a main memory 1900. Two or more of the ASIC 1100, the ASIP 1300, and the main processor 1700 may communicate with each other. At least two of the ASIC 1100, the ASIP 1300, the memory 1500, the main processor 1700, and the main memory 1900 may be embedded in one chip.

The ASIC 1100 may be an integrated circuit customized for a particular application and may include a radio frequency integrated circuit (RFIC), a modulator, a demodulator, or the like, for example. The ASIP 1300 may support a dedicated instruction set for a particular application and may execute instructions included in the instruction set stored in a memory (e.g., memory 1500). The memory 1500 may communicate with the ASIP 1300 and may store a plurality of instructions executable by the ASIP 1300 as a non-temporary storage device. The memory 1500 may also store data generated during execution of a plurality of instructions in the ASIP 1300. For example, the memory 1500 may be a random access memory (RAM), a read only memory (ROM), a tape, a magnetic disk, an optical disc, a volatile memory, a non-volatile memory, and a combination thereof. Furthermore, the memory 1500 may include any type of memory that may be accessed by the ASIP 1300.

The main processor 1700 may control a wireless communication apparatus 1000 by executing a plurality of instructions stored in a memory (e.g., main memory 1900). For example, the main processor 1700 may control the ASIC 1100 and the ASIP 1300, process data received through a wireless communication network, or process a user input regarding the user device 1000. The main memory 1900 may communicate with the main processor 1700 and store a plurality of instructions executed by the main processor 1700 as a non-temporary storage device. For example, the main memory 1900 may include random access memory (RAM), read only memory (ROM), a tape, a magnetic disk, an optical disk, volatile memory, nonvolatile memory, and a combination thereof that may be accessed by the main processor 1700.

The components of a terminal (e.g., the terminal 20 of FIG. 1) used for configuring channel estimation methods according to some of the above-stated example embodiments may be included in at least one of the components of the wireless communication apparatus 1000 of FIG. 17 (e.g., the ASIC 1100, the ASIP 1300, the memory 1500, the main processor 1700 and the main memory 1900). For example, at least one of the pre-coding detector 21 and the channel estimator 22 of FIG. 1 may be implemented via a plurality of instructions stored in the memory 1500. According to some example embodiments, at least one of the operations of the channel estimation methods of FIG. 4 may be implemented via a plurality of instructions stored in the memory 1500.

The ASIP 1300 may perform an operation of at least one of the pre-coding detector 21 and the channel estimator 22 of FIG. 1, or at least one operation, by executing a plurality of instructions stored in the memory 1500. In another example, at least one of the pre-coding detector 21 and the channel estimator 22 of FIG. 1, or at least one operation from among the operations of the channel estimation methods, may be implemented via a hardware block and included in the ASIC 1100. In another example, at least one of the pre-coding detector 21 and the channel estimator 22 of FIG. 1, or at least one operation from among the operations of the channel estimation methods, may be implemented via a plurality of instructions stored in the main memory 1900, and at least one of the pre-coding detector 21 and the channel estimator 22 of FIG. 1, or at least one operation from among the operations of the channel estimation methods, may be performed as the main processor 1700 executes the plurality of instructions stored in the main memory 1900.

While some example embodiments have been particularly shown and described, it will be understood that various changes in form and details may be made therein without departing from the spirit and scope of the following claims.

What is claimed is:

1. A channel estimation method of a wireless communication apparatus, the method comprising:
   receiving a first sub-frame and a second sub-frame, the first sub-frame including a plurality of first reference signals, the second sub-frame including a plurality of second reference signals, each of the first sub-frame and the second sub-frame including a preceding time slot and a later time slot, the plurality of first reference signals being pre-coded based on a first pre-coding matrix, and the plurality of second reference signals being pre-coded based on a second pre-coding matrix;
   determining whether the first pre-coding matrix and the second pre-coding matrix are the same based on a channel variation in a time domain; and
   performing channel estimation with respect to a resource element based on at least one first reference signal among the plurality of first reference signals and at least one second reference signal among the plurality of second reference signals in response to determining that the first pre-coding matrix and the second pre-coding matrix are the same, the resource element being included in the preceding time slot of the second sub-frame, the at least one first reference signal being included in the later time slot of the first sub-frame, and the at least one second reference signal being included in the preceding time slot of the second sub-frame.

2. The channel estimation method of claim 1, wherein, the performing channel estimation includes performing interpolation channel estimation with respect to the resource element based on at least one first channel value corresponding to the at least on first reference signal and at least one second channel value corresponding to the at least one second reference signal.

3. The channel estimation method of claim 1, wherein the performing channel estimation performs the channel estimation regarding the resource element based on reference signals adjacent to the resource element among the plurality of first reference signals and the plurality of second reference signals.

4. The channel estimation method of claim 1, wherein the performing channel estimation performs the channel estimation regarding the resource element based on all first reference signals among the plurality of first reference signals included in the later time slot of the first sub-frame and all second reference signals among the plurality of second reference signals included in the preceding time slot of the second sub-frame.

5. The channel estimation method of claim 1 wherein, the performing channel estimation performs the channel estimation regarding the resource element based on all of the plurality of first reference signals and the plurality of second reference signals.

6. The channel estimation method of claim 1, wherein, the determining whether the first pre-coding matrix and the second pre-coding matrix are the same includes:
calculating an inter sub-frame channel variation regarding the first sub-frame and the second sub-frame;
calculating a reference channel variation in the time domain; and
determining that the first pre-coding matrix and the second pre-coding matrix are the same in response to a difference between the inter sub-frame channel variation and the reference channel variation in the time domain being less than a critical value.

7. The channel estimation method of claim 6, wherein, the reference channel variation in the time domain includes a Doppler estimated value indicating a channel variation on a time axis due to a Doppler effect.

8. The channel estimation method of claim 6, wherein, the reference channel variation in the time domain includes an intra sub-frame channel variation regarding the second sub-frame.

9. The channel estimation method of claim 6, wherein, the reference channel variation in the time domain includes an average value of a first intra sub-frame channel variation regarding the first sub-frame and a second intra sub-frame channel variation regarding the second sub-frame.

10. The channel estimation method of claim 1, wherein, the performing channel estimation performs the channel estimation with respect to the resource element based on at least two of the plurality of second reference signals in response to determining that the first pre-coding matrix and the second pre-coding matrix are not the same.

11. The channel estimation method of claim 1, wherein the receiving successively receives the second sub-frame after the first sub-frame is received.

12. A channel estimation method of a wireless communication apparatus, the method comprising:
receiving a first sub-frame and a second sub-frame, the first sub-frame including a plurality of first reference signals, the second sub-frame including a plurality of second reference signals, the plurality of first reference signals being pre-coded based on a first pre-coding matrix, and the plurality of second reference signals being pre-coded based on a second pre-coding matrix;
calculating an inter sub-frame channel variation regarding the first sub-frame and the second sub-frame based on estimated channel values regarding resource elements corresponding to at least some of the plurality of first reference signals and at least some of the plurality of second reference signals;
determining whether the first pre-coding matrix and the second pre-coding matrix are the same based on the inter sub-frame channel variation; and
performing channel estimation with respect to a resource element included in the second sub-frame based on at least one of the plurality of first reference signals and at least one of the plurality of second reference signals in response to determining that the first pre-coding matrix and the second pre-coding matrix are the same.

13. The channel estimation method of claim 12, wherein the determining whether the first pre-coding matrix and the second pre-coding matrix are the same includes:
calculating a Doppler estimated value indicating a channel variation on a time axis due to a Doppler effect; and
determining that the first pre-coding matrix and the second pre-coding matrix are the same based on the inter sub-frame channel variation and the Doppler estimated value.

14. The channel estimation method of claim 13, wherein the determining whether the first pre-coding matrix and the second pre-coding matrix are the same includes:
determining that the first pre-coding matrix and the second pre-coding matrix are the same in response to a difference between the inter sub-frame channel variation and the Doppler estimated value being less than a critical value.

15. The channel estimation method of claim 12, wherein the determining whether the first pre-coding matrix and the second pre-coding matrix are the same includes:
calculating an intra sub-frame channel variation regarding the second sub-frame; and
determining that the first pre-coding matrix and the second pre-coding matrix are the same based on the inter sub-frame channel variation and the intra sub-frame channel variation.

16. The channel estimation method of claim 15, wherein the determining whether the first pre-coding matrix and the second pre-coding matrix are the same includes:
determining that the first pre-coding matrix and the second pre-coding matrix are the same in response to a difference between the inter sub-frame channel variation and the intra sub-frame channel variation being less than a critical value.

17. The channel estimation method of claim 12, wherein the determining whether the first pre-coding matrix and the second pre-coding matrix are the same includes:
calculating a first intra sub-frame channel variation regarding the first sub-frame;
calculating a second intra sub-frame channel variation regarding the second sub-frame;
calculating an average value of intra sub-frame channel variations by averaging the first intra sub-frame channel variation and the second intra sub-frame channel variation; and
determining that the first pre-coding matrix and the second pre-coding matrix are the same based on the inter sub-frame channel variation and the average value of intra sub-frame channel variations.

18. The channel estimation method of claim 17, wherein the determining whether the first pre-coding matrix and the second pre-coding matrix are the same includes:
determining that the first pre-coding matrix and the second pre-coding matrix are the same in response to a difference between the inter sub-frame channel variation and the average value of intra sub-frame channel variations being less than a critical value.

19. The channel estimation method of claim 12, wherein, the performing channel estimation includes performing interpolation channel estimation with respect to the resource element based on at least one first channel value corresponding to the at least one of the plurality of first reference signals and at least one second channel value corresponding to the at least one of the plurality of second reference signals.

20. The channel estimation method of claim 12, wherein
each of the first sub-frame and the second sub-frame includes a preceding time slot and a later time slot;
the resource element is included in the preceding time slot of the second sub-frame;
the at least one of the plurality of first reference signals is included in the later time slot of the first sub-frame; and
the at least one of the plurality of second reference signals is included in the preceding time slot of the second sub-frame.

* * * * *